(12) United States Patent
Furukawa et al.

(10) Patent No.: US 7,079,844 B2
(45) Date of Patent: Jul. 18, 2006

(54) BASE-STATION CELL DESIGN METHOD AND BASE-STATION CELL DESIGN APPARATUS, AND PROGRAM THEREOF IN MOBILE COMMUNICATION SYSTEM

(75) Inventors: Hiroshi Furukawa, Tokyo (JP); Koichi Ebata, Tokyo (JP)

(73) Assignee: NEC Corporation, Tokyo (JP)

( * ) Notice: Subject to any disclaimer, the term of this patent is extended or adjusted under 35 U.S.C. 154(b) by 161 days.

(21) Appl. No.: 10/689,727

(22) Filed: Oct. 22, 2003

(65) Prior Publication Data
US 2004/0127224 A1   Jul. 1, 2004

(30) Foreign Application Priority Data
Oct. 23, 2002 (JP) ............................. 2002-307732
Jun. 4, 2003 (JP) ............................. 2003-158759

(51) Int. Cl.
*H04Q 7/20* (2006.01)
*H04J 3/00* (2006.01)

(52) U.S. Cl. ............... 455/446; 445/456.1; 445/456.2; 370/345

(58) Field of Classification Search ............ 455/456.1, 455/132, 446, 403, 513, 456.2, 423, 454, 455/69; 370/345, 342, 252, 347
See application file for complete search history.

(56) References Cited

U.S. PATENT DOCUMENTS

| | | | | |
|---|---|---|---|---|
| 5,365,571 A | * | 11/1994 | Rha et al. | 455/446 |
| 5,842,131 A | * | 11/1998 | Yamane | 455/456.1 |
| 6,021,125 A | * | 2/2000 | Sakoda et al. | 370/345 |
| 6,064,890 A | * | 5/2000 | Hirose et al. | 455/513 |
| 6,111,857 A | | 8/2000 | Soliman et al. | |
| 6,154,657 A | * | 11/2000 | Grubeck et al. | 455/456.2 |
| 6,289,203 B1 | * | 9/2001 | Smith et al. | 455/67.11 |
| 6,459,895 B1 | * | 10/2002 | Hastings et al. | 455/424 |
| 6,553,233 B1 | * | 4/2003 | Lee et al. | 455/446 |

(Continued)

FOREIGN PATENT DOCUMENTS

EP    1 146 760 A2    10/2001

(Continued)

OTHER PUBLICATIONS

"Coverage Planning for Outdoor Wireless LAN System", Kamenetsky et al. 2002 International Zurich Seminar on Broadband Communications, pp. 49-1-49-6.

(Continued)

*Primary Examiner*—George Eng
*Assistant Examiner*—Kiet Doan
(74) *Attorney, Agent, or Firm*—Dickstein, Shapiro, Morin & Oshinsky, LLP

(57) ABSTRACT

The above base-station cell design method is for sequentially adding base stations, and a technique of which throughput is few is employed for a radio-wave propagation characteristic evaluation to be made in this addition, and a technique of which the throughput is much, but which is of high-precision, more specifically, a technique such as the ray tracing is applied for the radio-wave propagation characteristic evaluation to be made after addition. The result of the high-precision radio-wave propagation characteristic evaluation to be made after this addition is put to practical use for estimating an interference quantity in selecting the arrangement location of the base station to be added newly. This allows the quantity of the radio wave analytic processing, which accounts for a large majority of the base-station cell design processing, to be reduced, thus enabling a fast base-station cell design.

61 Claims, 18 Drawing Sheets

U.S. PATENT DOCUMENTS

| | | | |
|---|---|---|---|
| 2002/0094798 A1* | 7/2002 | Nurminen et al. | 455/403 |
| 2003/0040317 A1* | 2/2003 | Fattouch | 455/446 |
| 2003/0203723 A1* | 10/2003 | Persson et al. | 455/132 |

FOREIGN PATENT DOCUMENTS

| | | |
|---|---|---|
| JP | 8-317458 | 11/1996 |
| JP | 2001-285923 | 10/2001 |
| JP | 2002-107397 | 4/2002 |
| WO | WO 96/38875 | 12/1996 |
| WO | WO 01/72071 A1 | 9/2001 |
| WO | WO 02/35872 A1 | 5/2002 |

OTHER PUBLICATIONS

"A Ray Launching Method for Radio-Mobile Propagation in Urban Area," Rossi et al. Proc. of International Symposium on Antennas and Propagation Society, 1991, vol. 3, pp. 1540-1543.

Menolascino et al., "Third Generation Mobile Systems Planning Issues", Vehicular Technology Conference, 1998, Ontario, Canada, pp. 830-834 (1998).

Menolascino et al., "Storms", Software Tools for the Optimization of Resources in Mobile Systems, Storms Project Final Report, pp. 1-58 (Apr. 1999).

Kai Lieska ErkkiLaitinen, "Optimization of Gos of Cellular Network", pp. 2277-2281, IEEE PIMRC 2002, pp. 2277-2281 (Sep. 2002).

* cited by examiner

FIG. 3

| BASE-STATION CANDIDATE POINT | CHANNEL | T (A), Q (A, k) | O (T, Q) |
|---|---|---|---|
| A1 | k=1 | | |
| | k=2 | | |
| | k=3 | | |
| | k=4 | | |
| A2 | k=1 | | |
| | k=2 | | |
| | k=3 | | |
| | k=4 | | |
| | | | |

FIG. 14

| BASE-STATION CANDIDATE POINT | CHANNEL | KIND OF ANTENNA | INSTALLMENT DIRECTION | T (A), Q (A,k,t,d) | O (T,Q) |
|---|---|---|---|---|---|
| A1 | k=1 | t=1 | d=1 | | |
| | | | d=2 | | |
| | | t=2 | d=1 | | |
| | | | d=2 | | |
| | | | d=3 | | |
| | | | d=4 | | |
| | k=2 | t=1 | d=1 | | |
| | | | d=2 | | |
| | | t=2 | d=1 | | |
| | | | d=2 | | |
| | | | d=3 | | |
| | | | d=4 | | |
| | k=3 | t=1 | d=1 | | |
| | | | d=2 | | |
| | | t=2 | d=1 | | |
| | | | d=2 | | |
| | | | d=3 | | |
| | | | d=4 | | |
| A2 | k=1 | t=1 | d=1 | | |
| | | | d=2 | | |
| | | t=2 | d=1 | | |
| | | | d=2 | | |
| | | | d=3 | | |
| | | | d=4 | | |
| | k=2 | t=1 | d=1 | | |
| | | | d=2 | | |
| | | t=2 | d=1 | | |
| | | | d=2 | | |
| | | | d=3 | | |
| | | | d=4 | | |
| | k=3 | t=1 | d=1 | | |
| | | | d=2 | | |
| | | t=2 | d=1 | | |
| | | | d=2 | | |
| | | | d=3 | | |
| | | | d=4 | | |

BASE-STATION CELL DESIGN METHOD AND BASE-STATION CELL DESIGN APPARATUS, AND PROGRAM THEREOF IN MOBILE COMMUNICATION SYSTEM

BACKGROUND OF THE INVENTION

The present invention relates to a base-station cell design method, an apparatus and a program thereof in a radio communication system, and more particular to a base-station cell design technique such as base-station layout and base-station parameter setting in a mobile communication system.

A conventional base-station cell design technique will be explained by use of FIG. 17. Base-station candidates are arranged in locations displayed with black squares A02 to A06 on a service area A11 to evaluate a rate of areas A01, and A07 to A10 to be covered by the above base-station candidate group to a service area A11, i.e. an area coverage ratio. Similarly, the area coverage ratio is evaluated for the other arrangement location as well to repeat its evaluation until a base-station arrangement pattern in which a desired area coverage ratio is reached is obtained. In the event of making base-station installment of a trial-and-error optimal-arrangement search type like this, a detailed evaluation of a radio-wave propagation characteristic extending over the entire service area is required base station by base station whenever the base-station arrangement is given.

As another technique, there is a technique that a human being pre-narrows down a pattern to be evaluated for realizing a reduction in the computation time (for example, a patent document 1). Also, as yet another technique, there is a technique of employing genetic algorithm for realizing a reduction in the time required for the optimal-arrangement research (for example, a patent document 2). A further additional technique will be explained by employing FIG. 18 (for example, a non-patent document 1). In this non-patent document 1 was disclosed a base-station cell design technique of pre-arranging the regularly placed base stations in the locations indicated with black small points B02 within a service area B01 to sequentially delete the base stations that did not contribute to an increase in a covered area. It is required to make a high-precision radio-wave analysis within all the service area for all base-station candidates pre-arranged regularly.

[PATENT DOCUMENT 1]
JP-P1996-317458A (page 2 to 3, FIG. 1 to FIG. 3)
[PATENT DOCUMENT 2]
JP-P2001-285923A (page 2, FIG. 1)
[PATENT DOCUMENT 3]
JP-P2002-107397A
[NON-PATENT DOCUMENT 1]
M. Kamenetsky, et. al. "Coverage Planning for Outdoor Wireless LAN System", 2002 International Zurich Seminar on Broadband Communication Access, Transmission, Networking, Feb. 2002, pp 49-1 to 49-6
[NON-PATENT DOCUMENT 2]
Proc. of International Symposium on Antennas and Propagation Society, 1991, vol. 3, pp. 1540–1543

It has been generalized that the base-station cell design in a cellular system employs a specialized tool; however a covered area of an access point (AP: equivalent to the base station) is extremely narrow, a simple propagation-loss estimation equation employed in a conventional cellular system design is impossible to apply in a wireless LAN system to be installed in the environment where a lot of propagation disturbing objects such as a building exist in a line-of-sight propagation area of a radio wave, and a detailed radio-wave analysis, which took a microscopic structure such as a geographical feature of a target area and the building into consideration, is required.

A ray tracing technique is commonly used as a technique of the high-precision radio-wave analysis; however upon employing the cell design technique of the trial-and-error optimal-arrangement search type as shown in FIG. 17, as the case may be, there is the possibility that it takes an unrealistic processing time to gain a solution because the above technique needs a lot of computations. Needless to say, by narrowing the service area to be taken as an object of design, the AP number that has to be arranged is reduced, which enables a reduction in the processing time; however the base station number to be arranged per area becomes extremely numerous in a picocell environment like the wireless LAN, as compared with a macrocell/microcell environment in the conventional mobile communication system, whereby the problem occurs that the size of the area that can be designed within the realistic processing time does not come up to the necessary size of the area by far.

In other words, in designing the picocell system, a difficult task has to be tackled of coping with an increase in a base-station layout density while a radio-wave analysis, which requires a lot of the computations and is of high precision, is employed, that is, it is indispensable to achieve the fast base-station cell design algorithm.

Upon employing the base-station cell design technique disclosed in the patent document 1, the computation time can be reduced because a human being pre-narrows down the location candidates. However, the result varies anyway, depending upon the AP layout candidate selected firstly, and vague elements such as a perception and an experience of a designer dictate the selection of the AP layout candidate, thus the problem existed that an appropriate cell design was not always possible to guarantee.

The vagueness of the perception/experience of the designer can be excluded in the base-station cell design technique disclosed in the patent document 2; however it was pointed out that the solution did not converge, depending upon pre-setting of parameters such as initial layout, which gave rise to occurrence of an unstable phenomenon such as divergence and oscillation, and the problem existed that if there rose the situation where the convergence of the solution was unpromising, a work had to be done over again from the beginning.

In the base-station cell design technique disclosed in the non-patent document 1, there is no vague element like one shown in the patent document 1 at the time of the design, and also, such an unstable phenomenon shown in the patent document 2 does not occur. However, the base station number to be pre-determined, which is required for making an effective cell-layout design, is more than several tens of times as large as the base-station number to be determined finally. Thus, when the radio-wave analysis is made in terms of the plane in details within the service area with all candidate points thereof taken as a transmission point, after all is said and down, the enormous computation time is necessitated.

Also, either of the above-mentioned prior arts, which are for aiming only for optimization of the layout of AP, have no setting method of various design parameters (a transmitted electric power, channel allocation, etc.) shown. Also, in the event of making wide-range development by a plurality of the stations, an offset of the traffic density that depended upon the location becomes noticeable; however no traffic density was reflected in the cell design in either of the above-mentioned prior arts.

SUMMARY OF THE INVENTION

The present invention relates to a base-station cell design method of, in a case where the service area that becomes an target, and a traffic density distribution were given, arranging a plurality of the base stations to cover the above service area, and an objective thereof is to provide the base-station cell design method, and the apparatus and the program thereof that enable the arrangement of the base station satisfying a desired traffic coverage ratio (a rate of the traffic to be absorbed by the installed base station to all the traffic within the target service area), and the setting of the parameters (specifically, the channel allocation and the transmitted power), on the premise that a detailed radio-wave analysis simulator such as the ray tracing is put to practical use.

Another objective of the present invention is to provide the base-station cell design method, and the apparatus and the program thereof that enable exclusion of the vagueness without a necessity for the perception and experience of a person in selecting the base-station location candidate.

Yet another objective of the present invention is to provide the base-station cell design method, and the apparatus and the program thereof that enable a fast base-station cell design by reducing the quantity of the radio-wave analytic processing that accounts for a great majority of the base-station cell design processing.

The base-station cell design method in accordance with the present invention, which is a base-station cell design method adapted so that, in designing a base-station installment in a mobile communication system, a plurality of base-station candidate locations are given within a service area to install a base station in anyone of these base-station candidate locations, is characterized in including: an objective-function calculation step of calculating a predetermined objective-function responding to a traffic absorption quantity and (or) a communication quality value in each of said base-station candidate locations; and a base-station layout decision step of deciding a layout at which the base station is installed responding to this objective-function.

Another base-station cell design method in accordance with the present invention, which is a base-station cell design method adapted so that, in designing a base-station installment in a mobile communication system, a plurality of base-station candidate locations are given within a service area to decide anyone of these base-station candidate locations as a base-station installment layout while a radio-wave propagation characteristic estimation technique is used, is characterized in including the steps of: as a radio-wave propagation characteristic estimation technique within said service area with each of said base-station candidate locations taken as a transmission point, using a first radio-wave propagation characteristic estimation technique having a first precision to additionally install said base station; and as a radio-wave propagation characteristic estimation technique within said service area with a base-station additional-installment location after a case where said based station was installed taken as a transmission point, using a second radio-wave propagation characteristic estimation technique having a precision higher than said first precision.

Yet another base-station cell design method in accordance with the present invention, which is a base-station cell design method in a mobile communication system, wherein a service area, and a traffic density distribution within this service area are given to arrange a base station in the above service area, is characterized in including a base-station layout decision step of, with a rate of a total traffic quantity that can be absorbed by the base stations arranged within said service area to all the traffic quantity that occurs within said service area taken as a traffic coverage ratio, sequentially deciding layouts at which the base station is installed until said traffic coverage ratio exceeds a desired traffic coverage ratio.

The base-station cell design apparatus in accordance with the present invention, which is a base-station cell design apparatus adapted so that, in designing a base-station installment in a mobile communication system, a plurality of base-station candidate locations are given within a service area to install a base station in anyone of these base-station candidate locations, is characterized in including: objective-function calculation means for calculating a predetermined objective-function responding to a traffic absorption quantity and (or) a communication quality value in each of said base-station candidate locations; and base-station layout decision means for deciding a base-station layout at which the base station is installed responding to this objective-function.

Another base-station cell design apparatus in accordance with the present invention, which is a base-station cell design apparatus adapted so that, in designing a base-station installment in a mobile communication system, a plurality of base-station candidate locations are given within a service area to decide anyone of these base-station candidate locations as a base-station installment layout while a radio-wave propagation characteristic estimation technique is used, is characterized in including the means for: as a radio-wave propagation characteristic estimation technique within said service area with each of said base-station candidate locations taken as a transmission point, using a first radio-wave propagation characteristic estimation technique having a first precision to install said base station; and as a radio-wave propagation characteristic estimation technique within said service area with a base-station installment location after a case where said base station was installed taken as a transmission point, using a second radio-wave propagation characteristic estimation technique having a precision higher than said first precision.

Yet another base-station cell design apparatus in accordance with the present invention, which is a base-station cell design apparatus in a mobile communication system, wherein a service area, and a traffic density distribution within this service area are given to arrange a base station in the above service area, is characterized in including base-station layout decision means for, with a rate of a total traffic quantity that can be absorbed by the base stations arranged within said service area to all the traffic quantity that occurs within said service area taken as a traffic coverage ratio, sequentially deciding layouts at which the base station is installed until said traffic coverage ratio exceeds a desired traffic coverage ratio.

The program in accordance with the present invention, which is a program for causing a computer to execute a base-station cell design method adapted so that, in designing a base-station installment in a mobile communication system, a plurality of base-station candidate locations are given within a service area to install a base station in anyone of these base-station candidate locations, is characterized in including: an objective-function calculation step of calculating a predetermined objective-function responding to a traffic absorption quantity and (or) a communication quality value in each of said base-station candidate locations; and a base-station installment step of deciding a layout at which the base station is installed responding to this objective-function.

Another program in accordance with the present invention, which is a program for causing a computer to execute a base-station cell design method adapted so that, in designing a base-station installment in a mobile communication system, a plurality of base-station candidate locations are given within a service area to decide anyone of these base-station candidate locations as a base-station installment layout while a radio-wave propagation characteristic estimation technique is used, is characterized in including the steps of: as a radio-wave propagation characteristic estimation technique within said service area with each of said base-station candidate locations taken as a transmission point, using a first radio-wave propagation characteristic estimation technique having a first precision to additionally install said base station; and as a radio-wave propagation characteristic estimation technique within said service area with said base-station additional-installment location after a case where said base station was installed taken as a transmission point, using a second radio-wave propagation characteristic estimation technique having a precision higher than said first precision.

Yet another program in accordance with the present invention, which is a program for causing a computer to execute a base-station cell design method in a mobile communication system, wherein a service area and a traffic density distribution within this service area are given to arrange a base station in the above service area, is characterized in including a base-station layout decision step of, with a rate of a total traffic quantity that can be absorbed by the base stations arranged within said service area to all the traffic quantity that occurs within said service area taken as a traffic coverage ratio, sequentially deciding layouts at which the base station is installed until said traffic coverage ratio exceeds a desired traffic coverage ratio.

Another base-station cell design method in accordance with the present invention, which is a base-station cell design method of, in designing a base-station installment in a mobile communication system, designing parameters to be set for base stations given in plural within a service area, is characterized in including: an objective-function calculation step of calculating a predetermined objective-function responding to a traffic absorption quantity and (or) a communication quality value in each of said base stations; and a base-station parameter decision step of deciding parameters for installing the base station responding to this objective-function.

Another base-station cell design apparatus in accordance with the present invention, which is a base-station cell design apparatus for, in designing a base-station installment in a mobile communication system, designing parameters to be set for base stations given in plural within a service area, is characterized in including: objective-function calculation means for calculating a predetermined objective-function responding to a traffic absorption quantity and (or) a communication quality value in each of said base stations; and base-station parameter decision means for deciding parameters for installing the base station responding to this objective-function.

Another program in accordance with the present invention, which is a program for causing a computer to execute a base-station cell design method of, in designing a base-station installment in a mobile communication system, designing parameters to be set for base stations given in plural within a service area, is characterized in including: an objective-function calculation step of calculating a predetermined objective-function responding to a traffic absorption quantity and (or) a communication quality value in each of said base stations; and a base-station parameter decision step of deciding parameters for installing the base station responding to this objective-function.

In accordance with the base-station cell design method in accordance with the present invention, the above method is for sequentially adding the base stations, and in this addition, a method is employed of defining an objective-function of which an argument is at least one of the traffic absorption quantity and the communication quality value to add the base station responding to this objective-function, whereby a quantitatively correct judgment becomes possible in selecting the base-station arrangement location.

Also, a technique of which the throughput is few is employed in the radio-wave propagation characteristic evaluation to be made in adding the base station, and a technique of which the throughput is much, but which is of high-precision, more specifically, a technique such as the ray tracing is applied in the radio-wave propagation characteristic evaluation to be made after addition. The result of the high-precision radio-wave propagation characteristic evaluation, which is made after addition, is put to practical use for estimating the interference quantity in selecting the arrangement location of the base station to be added newly. This allows the quantity of a radio-wave analytic processing that accounts for a great majority of the base-station cell design processing to be reduced, thus enabling a fast base-station cell design.

Furthermore, in accordance with the base-station cell design method in accordance with the present invention, the above method is for sequentially deleting the base stations that do not contribute to an increase in the traffic coverage ratio from the above-mentioned additional base-station group, and a new radio-wave analysis is not required for this already-installed base-station group that was additionally installed in sequentially deleting the base stations because the high-precision radio-wave analysis has already been completed in the entire service area with each taken as a transmission point.

The present invention having the features as mentioned above can exclude the vagueness that was at stake in the patent document 1 because a mechanical processing applies without a necessity for the perception and the experience of a person in selecting the location candidate, and can provide the station-installment design algorithm that does not give rise to the unstable phenomenon that was at stake in the patent document 2, and yet that enables the base-station cell design with at most several times of the radio-wave propagation characteristic evaluation, or something like it as against the base station number to be arranged finally.

BRIEF DESCRIPTION OF THE DRAWINGS

This and other objects, features and advantages of the present invention will become more apparent upon a reading of the following detailed description and drawings, in which:

FIG. 3 is a view illustrating an example of the recorded contents over the memory of the traffic absorption quantity T, the quality value Q, and the objective-function O at each base-station candidate point;

FIG. 14 is a view illustrating another example of the recorded contents over the memory of the traffic absorption quantity T, the quality value Q, and the objective-function O at each base-station candidate point;

DESCRIPTION OF THE EMBODIMENTS

Figure 1:
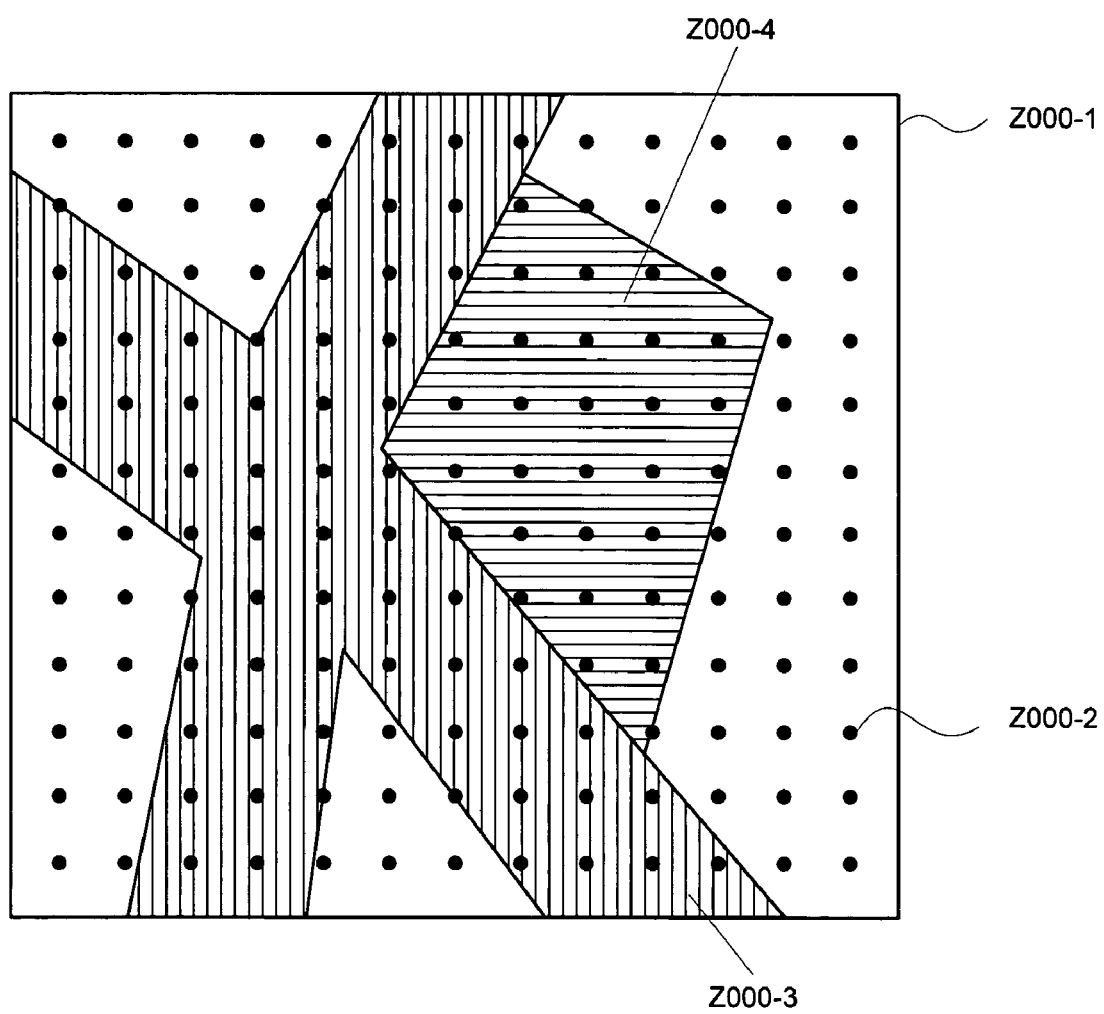
FIG. 1 is a view illustrating the specification of the service area, the base-station arrangement candidate point, and the traffic distribution.

Embodiments of the present invention will be explained in details below by referring to the accompanied drawings. Firstly, the base-station cell design algorithm of the present invention premises that the service area, the base-station location candidate point, and the traffic distribution are given (for example, the traffic distribution can be estimated from the traffic quantity etc. on a road that exists within a service area Z000-1). FIG. 1 is a view illustrating a setting example of each parameter thereof. Z000-1 represents the service area, and a small black circle Z000-2 indicates one of the base-station location candidate points. Also, there is also a case where the location candidate point is three-dimensionally specified, and there is a case where a plurality of observation points are specified that have an identical XY coordinate, and yet have different Z-axis coordinates respectively. Furthermore, there is a case where the setting is made of the location candidate having even a direction of the base station considered in the event of using a directive antenna, and so forth. That is, for example, a case corresponds hereto where an identical XYZ coordinate point is seasoned with information relating to the direction of the base station, and where a plurality of the location candidate points are set.

In selecting the location candidate point, the location candidate point is pre-excluded of the location where the base station is physically impossible to install. Also, there is a case where the order of installment priority is set for each location candidate point because a location such that the base station should be intentionally installed might exist. In FIG. 1, assume that geographic information such as a geographical feature, a road, building structure data, of which the display was omitted in the figure, is specified in details within the service area Z000-1 so as to estimate the high-precision radio-wave propagation characteristic.

Domains Z000-3 and Z000-4 represent the traffic density distribution, and the traffic having a different traffic density was supposed to occur uniformly in each domain. There is a case where the traffic distribution is given non-uniformly. In the traffic distribution model shown in FIG. 1, assume that no traffic occurs in the area other than the domains Z000-3 and Z000-4. There is also a case where is excluded the base-station location candidate point of the area in which no traffic occurs so as to reduce the calculation amount for making the propagation characteristic estimation. For example, upon thinking that no traffic occurs in the domain in which a river, a pond, etc. exist, the base-station location candidate point can be excluded from these domains. However, in the event of the domain in which the station installment is possible, the base-station location candidate point thereof is not excluded (for example, Z1-6 of FIG. 5), even though no traffic occurs.

Figure 2:
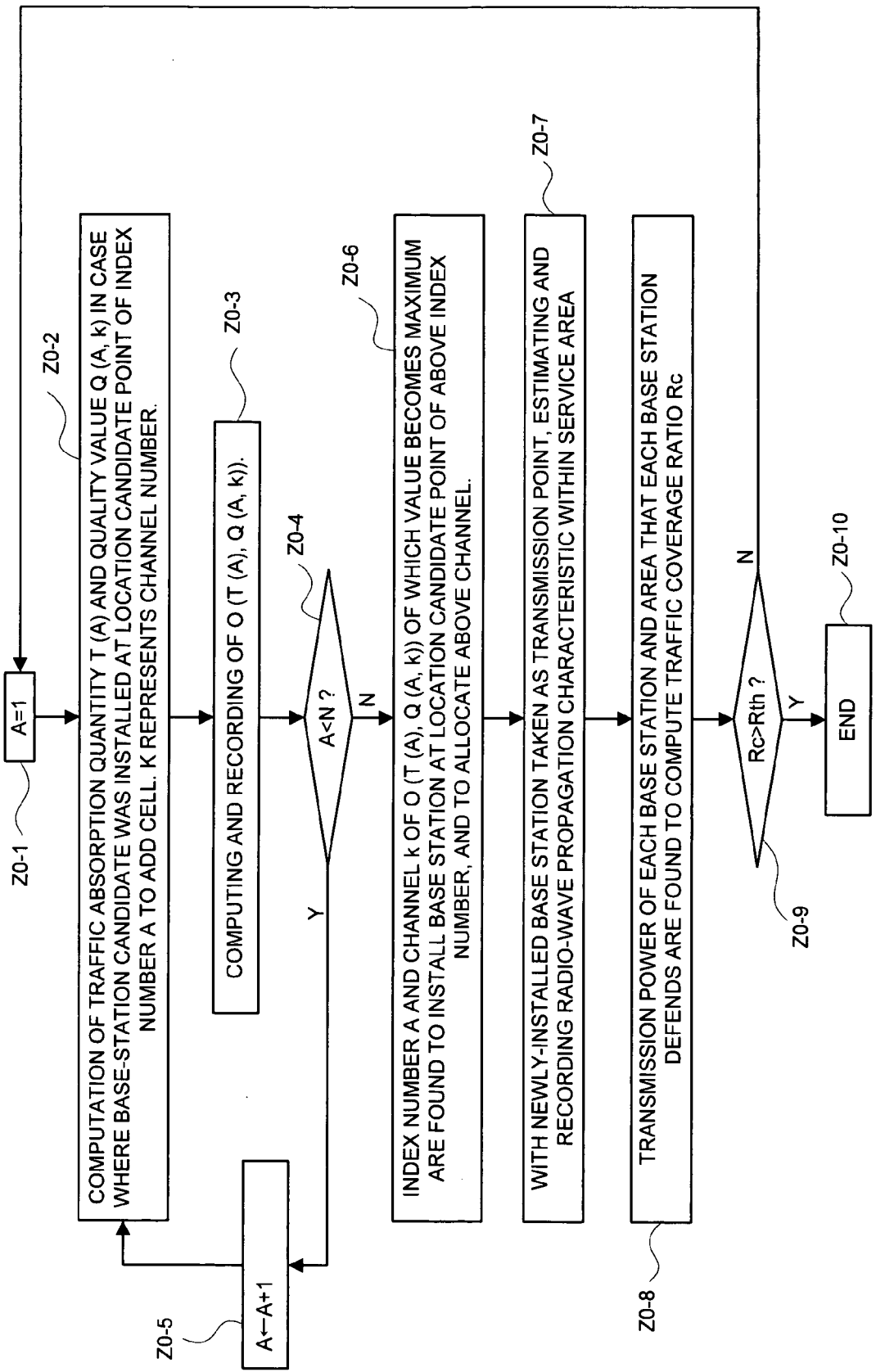
FIG. 2 is a flowchart illustrating the operation of the first embodiment in the base-station cell design algorithm of the present invention.

FIG. 2 is a flowchart illustrating a first embodiment of the base-station cell design algorithm that the present invention shows. As one example is shown in FIG. 1, assume that N (N is an integral number equal to or more than 2) base-station location candidate points were given, and assume that index numbers 1 to N were allocated for the base-station location candidate points respectively.

In a step Z0-1, an index variable A is set at 1 (one). In a step Z0-2, a traffic absorption quantity is set at T (A), and a communication quality value (hereinafter, referred to simply as a quality value) at Q (A, k) in a case where it was supposed that the base-station candidate was installed at the base-station location candidate point of an index number A to add the cell, and respective values are computed. Here k indicates a channel number. For example, the quality value Q (A, k) is computed for each of four channels in the case that four channels are available.

A shape of the cell to be formed by the basestation at a location candidate is set as a fixed shape, or is set by employing a first radio-wave propagation characteristic estimation technique. For this first radio-wave propagation characteristic estimation technique, a radio-wave propagation characteristic estimation technique, which is of low estimation precision, but of which the calculation amount is few, is employed. For example, a radio-wave propagation characteristic estimation model of attenuating in proportional to an exponential power of a distance, etc. corresponds hereto. In this case, a propagation constant of the distance attenuation is decided responding to the propagation circumstance where the base-station cell design is made. Or, there is a case where the ray tracing technique having the precision lowered is utilized as the first estimation technique.

The ray tracing technique is a technique to be employed in making the high-precision propagation estimation, and the known technique disclosed, for example, in Proc. of International Symposium on Antennas and Propagation Society, 1991, Vol. 3, pp. 1540–1543 (non-patent document 2), JP-P2002-107397A (patent document 3), etc can be used for a ray-launching technique known as one packing technique thereof. In the event of requiring this radio-wave propagation estimation technique for the high precision, a lot of the calculation amount is needed; however lowering the precision allows the calculation amount to be reduced. As a method of lowering the precision, a cutback in the reflection number of the radio wave, etc. is listed.

As to the traffic absorption quantity T (A), there are a case where it indicates the traffic quantity to be absorbed by the cell that the base-station candidate forms, a case where it indicates a total quantity of the traffic quantity to be absorbed by all the cell that the above base-station candidate forms and the cells that the already-installed base stations form respectively, a case where the traffic quantity is employed that occurs within the area to be covered by the additional base-station candidate to be computed by the traffic density distribution, a case where the traffic quantity is employed that occurs in the area other than the area covered by the already-installed base stations, out of the areas to be covered by the additional base-station candidate to be calculated by the traffic density distribution, and so forth. Also, there is also a case where each said quantity is given with a rate as against a total traffic quantity that occurs within the service area.

As to the quality value Q (A, k), there are a case where it indicates an average of the quality values to be observed in the cell that the base-station candidate forms, a case where it indicates a rate at which the quality to be observed in the cell that the above base-station candidate forms, and the cells that the already-installed base stations form, respectively, satisfies a desired value, and a case where it indicates an average value of the above quality. Herein, as to the so-called quality value, there are a case where it is given as a desired received signal power/(an undesired received signal power+a noise signal power) at the observation point, a case where it is given as the desired received signal power/the undesired received signal power at the observation point, and a case where it is given as various error rates such as a bit error rate and a frame error rate at the observation point. Furthermore, as to the quality value Q (A, k), there are a case where it is specified by the traffic quantity that occurs in the area in which the quality, which is observed in the cell that the above base-station candidate forms and in the cells that the already-installed base stations form, respectively, satisfies a desired value, and a case where it is specified by a rate of said quantity to the traffic quantity that occurs in the entire service area. The quality value Q is checked for all channels that the system can allocate.

Next, in a step Z0-3, an objective-function O (T (A), Q (A, k)) of which an argument is the traffic absorption quantity T (A), and the quality value Q (A, k) is computed to store it in a memory. Contents recorded in the memory in this case are ones as shown in FIG. 3. That is, T (A), Q (A, k), and O ((A), Q (A, k)) are to be recorded respectively, responding to four channels k=1 to 4 respectively at each base-station candidate point to be shown with an index number A (shown as A1, A2, . . . ).

Herein, as to the value of the objective-function O to be recorded, there are a case where it is specified only by the traffic absorption quantity T, and a case where it is specified only by the quality value Q. An example of the objective-function O will be described later by referring to FIG. 4.

In a step Z0-4, it is determined whether the index variable A is less than a base-station location candidate point number N, and if A<N, in a step Z0-5, then the steps subsequent to the step Z0-2 are repeated after 1 (one) is added to A. If A≧N in a step Z0-4, then the process proceeds to a step Z0-6. In the step Z0-6, the objective-function of which the value becomes maximum is to be selected from among all recorded ones to decide to locate the base station at the base-station arrangement location candidate point having the index number of the above objective-function, and the channel number of the above objective-function is allocated for the above base station.

In a step Z0-7, with the base station for which installment was newly decided in the step Z0-6 taken as a transmission point, the radio-wave propagation characteristic is estimated in the entire service area to record it. Herein, the second radio-wave propagation characteristic estimation technique is employed for estimating the radio-wave propagation characteristic. A technique, of which the estimation calculation amount is much, but which is of high estimation precision as compared with the first radio-wave propagation characteristic estimation technique, is employed for the second radio-wave propagation characteristic estimation technique. For example, the high-precision radio-wave propagation characteristic analytic technique such as the ray tracing corresponds hereto. An estimation result is recorded in a memory, a disk, etc. As one example of the estimation result are listed a received electric power (or propagation loss), or the received electric power (or propagation loss) and a delay spread, or a path profile that is composed of a delay time and the received electric power (or propagation loss) for each arrived pass at each observation point, and so forth.

In a step Z0-8, by making a reference to the estimation result of the radio-wave propagation characteristic computed and stored by the second radio-wave propagation characteristic estimation technique, which is related to all base stations for which installment was decided thus far, the transmitted power of each base station, and the area (cell) that each base station covers are found to compute the traffic coverage ratio Rc. A cell is defined as a group of minute areas into which the service area is divided. Those minute areas belong to the cell covered by a base station when the minute areas have the minimum propagation loss and desired received quality for the base station.

Herein, the size/shape of each cell varies with not only the radio-wave propagation characteristic, but also the setting of the transmitted power and a received threshold of each station. The so-called received threshold herein is a threshold in performing a demodulation processing in a receiver, and the demodulation is performed only when the received signal satisfies the above threshold. The received threshold is known as a CSMA threshold, a receiver threshold, etc. in a carrier sense multiple access (CSMA) technique that has been put to practical use in the wireless LAN, etc. It is necessary to set the transmitted power of the base station, and (or) the received threshold as well simultaneously in finding the covered area of each base station. The larger the transmitted power is, and the lower the received threshold is, the larger cell spreads, which leads to an increase in the traffic that occurs within the cell.

However, there is the upper limit to the traffic quantity that can be processed in one base station. Therefore by operating the transmitted power and (or) the received threshold, the traffic quantity inside the cell is set to be less than the maximum traffic quantity that can be processed in one base station. In addition, as to the transmission power and the received threshold, there is the range thereof in which respective values can be set, whereby regulation is made within the respective setting ranges in operating both parameters.

In computing this traffic coverage ratio Rc, the channel allocation for the base station of which installment was newly decided also can be rechecked. The reason is that the channel reallocation by employing the more precise propagation characteristic by the second propagation characteristic estimation technique can provide more interference tolerance. Because the channel allocation for which installment was newly decided was employed by the first propagation estimation technique. The re-checking processing of the channel allocation is performed as follow. At first, the objective-function is re-computed on the supposition that the newly installed base station used each channel according to the propagation characteristic estimated by the second propagation characteristic estimation technique. The channel of which the objective-function becomes maximum is used among respective channels.

After the transmission power of each base station installed as mentioned above, and the size/shape of the area that the above base station defended were decided, a rate of a total traffic to be absorbed by the base station group for which installment was decided to a total traffic quantity that occurs within the entire service area is found to specify this as a traffic coverage ratio Rc.

In a step Z0-9, the traffic coverage ratio Rc is compared with a required traffic coverage ratio Rth, if Rc≦Rth, then the processing returns to the step Z0-1, and if Rc>Rth is satisfied, then the base-station installment processing is completed (a step Z0-10).

The first embodiment of the present invention explained by use of FIG. 2 is characterized in sequentially adding the base stations one by one. Taking the traffic quantity into consideration in the stage of adding the base station enables the appropriate base-station cell design that responded to roughness/fineness of the traffic quantity, thus allowing the propagation quality to be prevented from deteriorating due to congestion. Also, the cell design having high tolerance against the interference is achieved possible because the cell design, which took the interference quantity into consideration, is made with the second radio-wave propagation characteristic estimation such as the ray tracing forecasted in high precision. The second radio-wave propagation characteristic estimation evaluation, which is of high precision but requires a lot of the calculation amount, is made after the base-station arrangement location was decided, and the first radio-wave propagation characteristic estimation technique of which the calculation amount is few is employed at the time of the additional base-station search processing.

That is, in accordance with the present invention, the high-precision radio-wave propagation characteristic evaluation extending over the entire service area should be executed only for the base station to be installed finally, which enables a reduction in the time required for the base-station arrangement design, as compared with the technique of the non-patent document 1 that requires the high-precision radio-wave propagation characteristic evaluation extending over the entire service area for all base-station candidate points. Furthermore, as compared with the prior art disclosed in the patent document 1, the present invention enables the cell design having always a constant effect without a help of the experience/perception of design experts. Also, as compared with the prior art disclosed in the patent document 2, similarly to the comparison with the non-patent document 1, the effect such that a drastic reduction in the design processing time is achieved.

Figure 4:
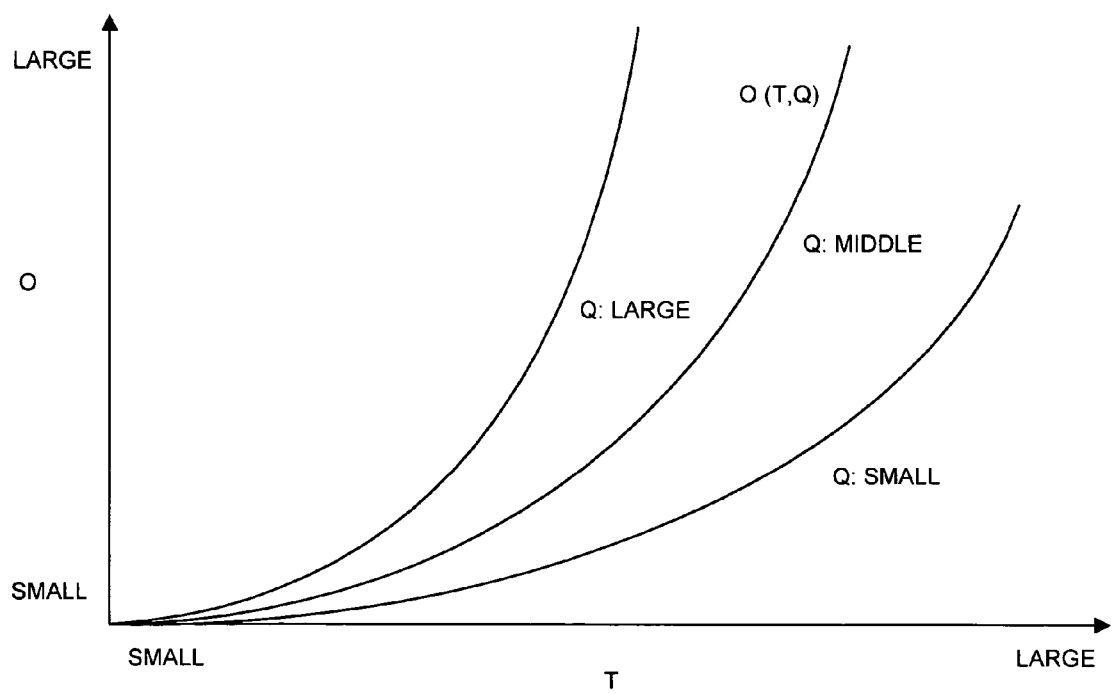
FIG. 4 is a view illustrating one example of the objective-function O.

FIG. 4 is a view illustrating one example of the objective-function O with the traffic absorption quantity T and the quality value Q taken as an argument. The setting is made so that the higher the traffic absorption quantity T is, and the higher the quality value Q is, the larger the objective-function becomes. Introduction of the objective-function shown in FIG. 4 allows two evaluation indexes of the traffic absorption quantity and the quality value to be integrated for handling at the time of the base-station cell design.

In addition, as an example of the objective-function O,
O=Q * T, or
O=a * Q+b * T (a and b are a constant), or
O=α* Q+(1−α) * T (α is a weighted coefficient, and 0<α<1), and so forth, can be assumed; however it is not limited hereto. In addition, * represents multiplication in each above-mentioned equation.

Furthermore, in the event that an installment priority P was set for each of the location candidate points, there is a case where the above-mentioned objective-function O is further multiplied by the installment priority P (or the installment priority P is added after weighting) to employ this as an objective-function. As the case may be, the objective-function O has an identical value, even though A (location candidate point), and k (channel) thereof are different respectively. This could happen because the traffic absorption quantity of each base station is limited to the maximum traffic that the base station can accommodate. For this, as a secondary judgment stuff, a different objective-function O' (T', Q') is sometimes employed. For example, not by taking the maximum traffic that AP can accommodate into consideration in T' in the objective-function O', O' different from the objective-function O can be employed as a secondary judgment stuff.

Figure 5:
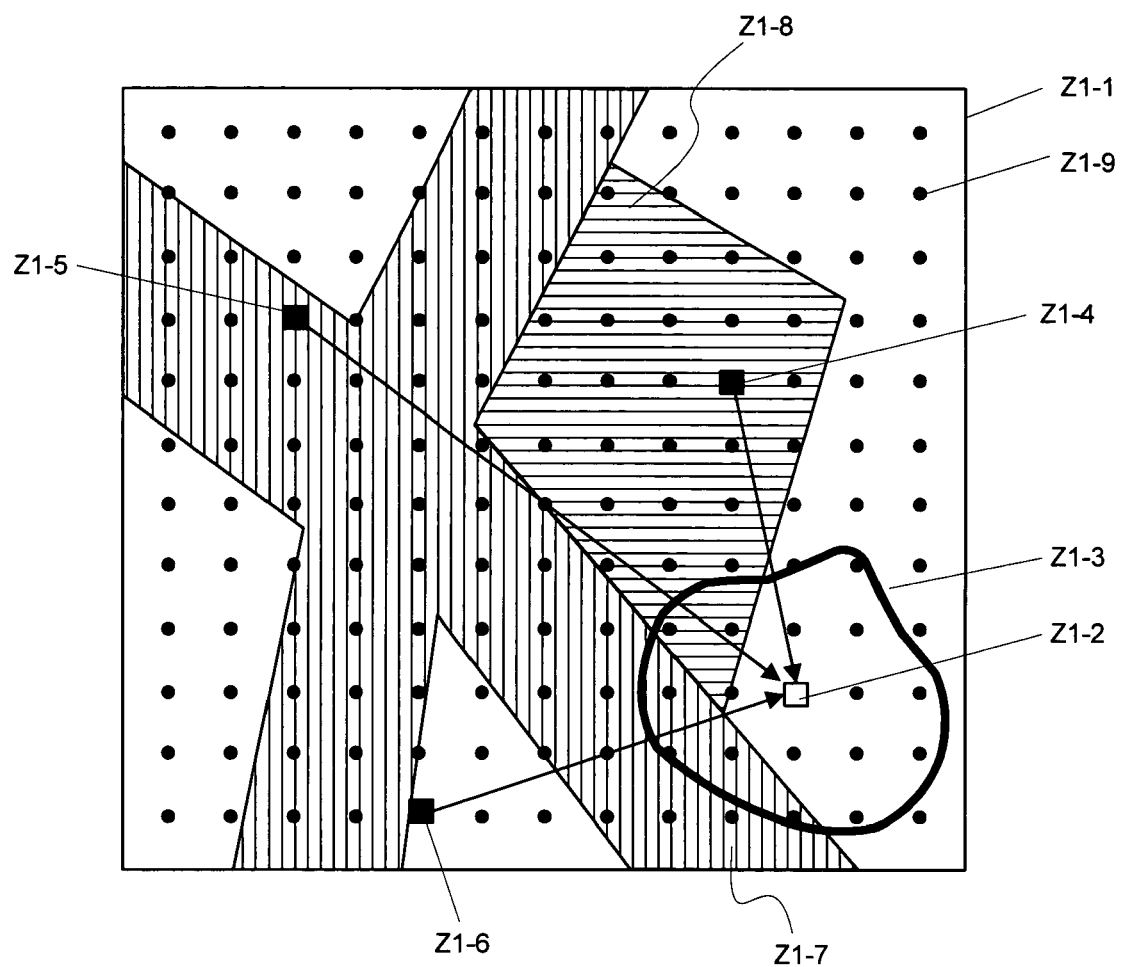
FIG. 5 is a model-type view illustrating the embodiment of the present invention.

Next, how the objective-function O is found for a certain base-station candidate will be explained specifically. FIG. 5 is a view explaining the situation where the objective-function O is decided in the present invention in a model-type manner. In FIG. 5, a service area Z1-1 is given, and the traffic distribution is given like domains Z1-7 and Z1-8 shown with oblique lines within the service area Z1-1. The domains Z1-7 and Z1-8 differ in a traffic occurrence density. A black small circle Z1-9 indicates the base-station location candidate point, black squares Z1-4 to Z1-6 indicate the already-installed base stations, or the base station for which installment was decided in the step Z0-6 of FIG. 2 by employing a method relating to the present invention. A white square Z1-2 indicates the base-station candidate installed at a certain location candidate point, and how the objective-function O can be found for the base-station candidate will be explained below.

At first, a cell Z1-3 that the above base-station candidate Z1-2 forms is specified. At this time, the shape of the cell Z1-3 can be found in the step Z0-2 of FIG. 2. As to the cell Z1-3, there is a case where a fixed shape is pre-allocated for it, and a case where it is decided by the transmitted power that the above base-station candidate Z1-2 emits, and the propagation loss to be obtained by said first radio-wave propagation characteristic estimation technique. In the latter case, the transmitted power is decided as follows. That is, the transmitted power is the transmitted power regulated so that the traffic quantity that occurs within the cell becomes the maximum traffic quantity that one base station can process, or the maximum transmitted power, whichever is lower.

As one example of how to find the transmission power, the following can be considered. At first, suppose the cell at the time that the transmission power was maximized to calculate the traffic quantity to be absorbed within the above cell, if this calculated traffic quantity is fewer than the maximum traffic quantity that one base station can process, to assume that the transmitted power is the maximum power of this base station, and to assume that the cell is the above-mentioned calculated cell. Also, when the above calculated traffic quantity is larger than the maximum traffic quantity that one base station can process, assume the transmission power, which is enough to cover the cell that absorbs the traffic that corresponds to this maximum traffic quantity, to be a transmitted power of this base station.

The traffic absorption quantity T is equivalent to a total quantity of the traffic that occurs inside the cell Z1-3. That is, it is the traffic quantity that occurs in respective portions of the domains Z1-7 and Z1-8 to be included inside the cell Z1-3.

The quality value Q, which is given as a function of the total sum of the interference quantities from the already-installed base stations Z1-4 to Z1-6 that are received in the location candidate Z1-2, is defined so that the lower the total sum of the interference quantities is, the higher it becomes. For example, the quality value Q is defined so as to be inversely proportional to the total sum of the interference quantity. The interference quantity from each of the already-installed base stations Z1-4 to Z1-6 is decided by those interference transmission power and the propagation loss up to the location candidate. As to the interference-wave transmitted power, there are a case where the fixed value is employed for it, and a case where it is set in proportional to the size of the traffic to be loaded on the above already-installed base station. The result of the high-precision propagation-loss estimation computed and stored by said second radio-wave propagation characteristic estimation technique is applied for the propagation loss from each above already-installed base station up to the location candidate point.

After the traffic absorption quantity T and the quality value Q were found as mentioned above, the calculation is performed with the objective-function O exemplified in FIG. 4.

In accordance with the embodiment relating to the objective-function O decision explained in FIG. 5, the base-station cell design becomes possible that took into consideration the traffic quantity that occurs within the cell to be formed by the base-station candidate, and the interference quantity that is received in the above base station. This embodiment is characterized in that, in the event that the base station is installed at the base-station location candidate point, the base-station installment is made more preferentially for the installment location in which the traffic quantity is processed the more by the above base station, or the less the interference quantity is.

Figure 6:
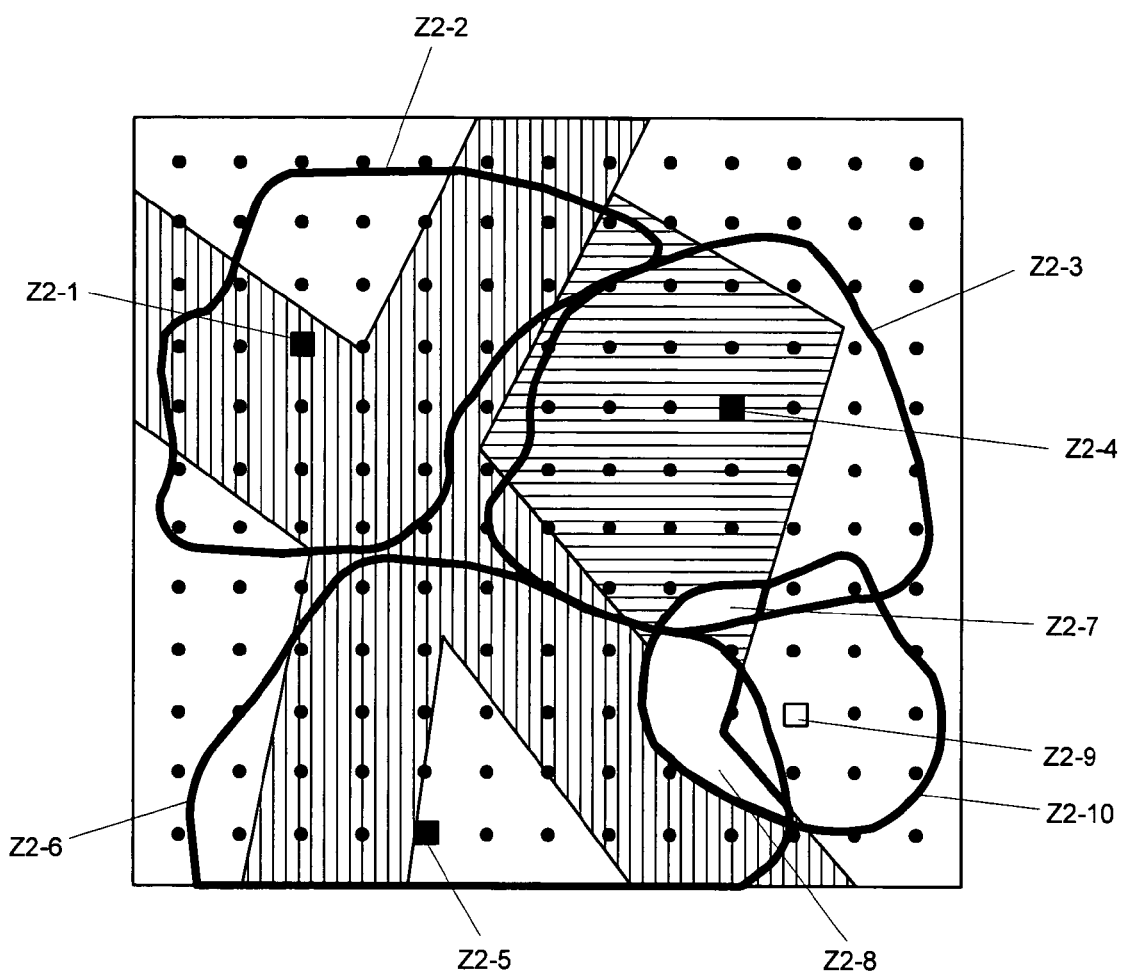
FIG. 6 is a view illustrating an additional embodiment relating to the specification of the traffic absorption quantity T.

FIG. 6 is a view illustrating an additional embodiment relating to the specification of the traffic absorption quantity T in FIG. 5. In FIG. 6, Z2-1, Z2-4, and Z2-5 indicate the already-installed base stations, or the base station for which installment was decided in the step Z0-6 of FIG. 2 employing a method relating to the method of the present invention, respectively, and Z2-9 indicates the base-station candidate. The cells to be formed by the already-installed base stations of Z2-1, Z2-4, and Z2-5 are Z2-2, Z2-3, and Z2-6 respectively, and the cell to be formed by the base-station candidate Z2-9 is Z2-10.

It is supposed that, in deciding the cells to be formed by the already-installed base stations (Z2-1, Z2-4, and Z2-5), the result of the high-precision propagation-loss estimation computed and stored by said second radio-wave propagation characteristic estimation technique (Z0-7 of FIG. 2) is applied, and also, that the appropriate base-station selection is employed in each minute area within the service area. Herein, the so-called base-station selection for each minute area indicates an action of, in the event that a terminal was assumed to exist in a certain minute area, connecting to the base station satisfying a desired received quality, and having the minimum propagation loss, or an action of connecting to the base station satisfying a desired received quality that can realize communication of which the received quality or the received signal power is high. That is, the above base-station selection is made, thereby allowing formation of a cell boundary such that the best communication quality can be assured in each location within the service area.

However, each minute area does not select the base-station candidate Z2-9 at the time of selecting the base station, and the cell boundary of the base-station candidate Z2-9 assumes a fixed shape, or a shape like Z2-10 to be found by said first radio-wave propagation characteristic estimation technique. The traffic that occurs within the cell formed in such a manner is to be absorbed by the base station that takes charge of the above cell.

In addition, the limit value is set at the traffic quantity that one base station can accommodate, and the traffic quantity that occurs within the cell found above, or the allowable traffic quantity of the base station, whichever is lower, can be assumed to be the traffic quantity to be accommodated in the above cell.

An additional embodiment relating to the specification of the traffic absorption quantity T shown in FIG. 6 is characterized in, at the time of calculating the traffic absorption quantity T for a cell Z2-10, excluding the traffic that occurs in the domains Z2-7, and Z2-8 that the already-installed base stations Z2-4 and Z2-5 have already covered. Excluding the traffic already absorbed by the already-installed base stations from the traffic quantity T to be loaded on the base station that is newly added allows more correct traffic quantity T to be estimated.

Figure 7:
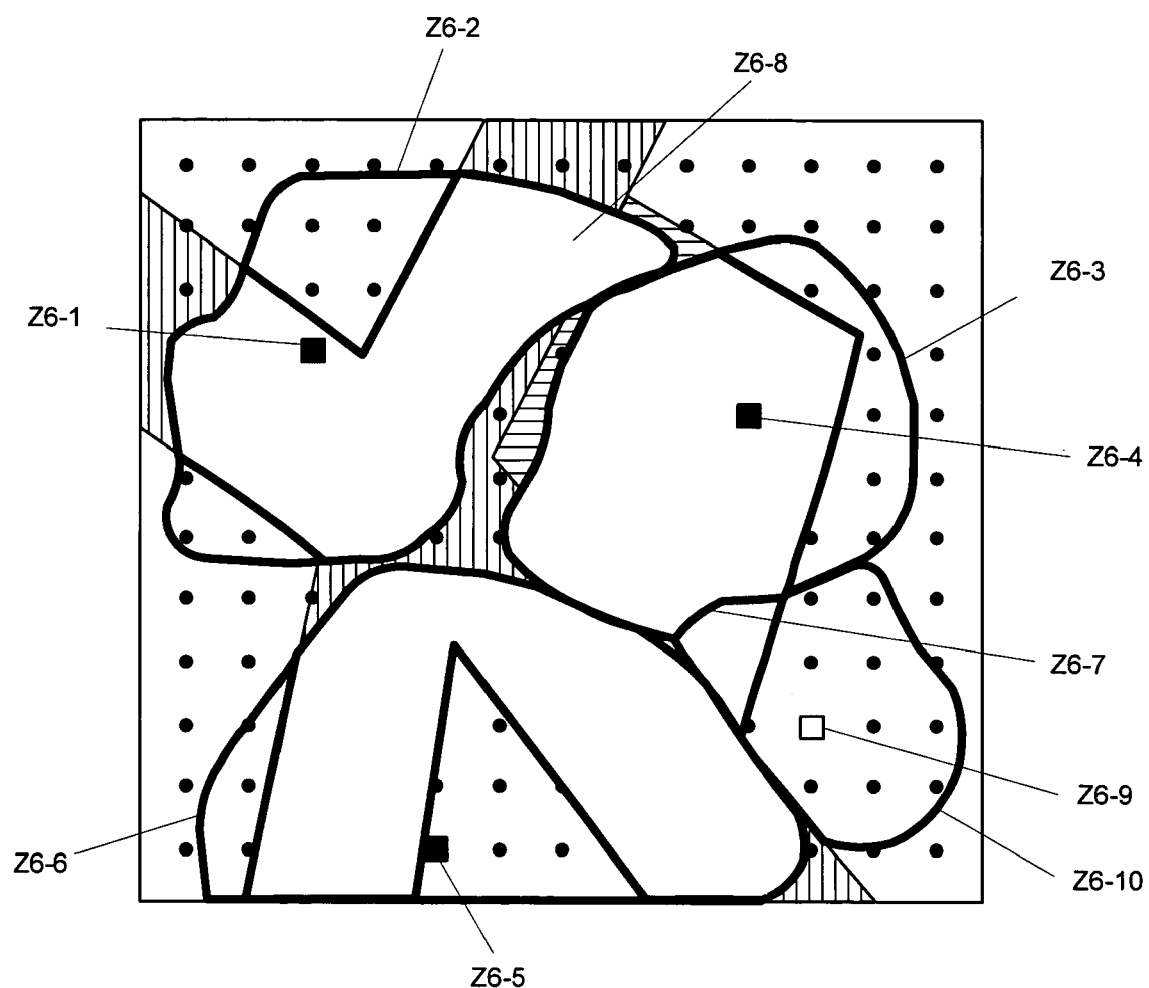
FIG. 7 is a view illustrating a further embodiment relating to the specification of the traffic absorption quantity T.

FIG. 7 indicates a further embodiment relating to the specification of the traffic absorption quantity T. In FIG. 7, Z6-1, Z6-4, and Z6-5 indicate the already-installed base stations, or the base station for which installment was decided in the step Z0-6 of FIG. 2 by employing a method relating to the method of the present invention, respectively, and Z6-9 indicates the base-station candidate. The cells to be formed by the already-installed base stations Z6-1, Z6-4, and Z6-5 are Z6-2, Z6-3, and Z6-6 respectively, and the cell to be formed by the base-station candidate Z6-9 is Z6-10. In deciding the cells to be formed by the already-installed base stations, the result of the high-precision propagation-loss estimation computed and stored by said second radio-wave propagation characteristic estimation technique (Z0-7 of FIG. 2) is applied. Also, the cell to be formed by the base-station candidate Z6-9 is found by employing the result of the propagation characteristic estimation to be computed by said first radio-wave propagation characteristic estimation technique. It is supposed that the appropriate base-station selection is employed in each of minute area within the service area.

Herein, the so-called base-station selection for each minute area indicates an action of, in the event that a terminal was assumed to exist in a certain minute area, connecting to the base station satisfying a desired received quality and having the minimum propagation loss, or an action of connecting to the base station satisfying a desired received quality that can realize communication of which the received quality or the received signal power is high. That is, the above base-station selection is employed, thereby allowing formation of a cell boundary such that the best communication quality can be assured in each location within the service area. The traffic that occurs within the cell formed in such a manner is to be absorbed by the base station that takes charge of the above cell.

In addition, the limit value is set at the traffic quantity that one base station can accommodate, and the traffic quantity that occurs within the cell found above, or the allowable traffic quantity of the base station, whichever is lower, can be assumed to be the traffic quantity to be accommodated in the above cell.

A further embodiment relating to the specification of the traffic absorption quantity T shown in FIG. 7 is characterized in assuming a total quantity of the traffic to be absorbed by the already-installed base stations Z6-1, Z6-4, and Z6-5, and the base-station candidate Z6-9 to be the traffic absorption quantity T.

The traffic absorption quantity T is defined as a total quantity of the traffic to be absorbed by the already-installed base stations and the base-station candidate within the service area. Hence, a base station candidate that can absorb maximum traffic quantity accompanied with already installed base stations is selected to be newly added.

Figure 8:
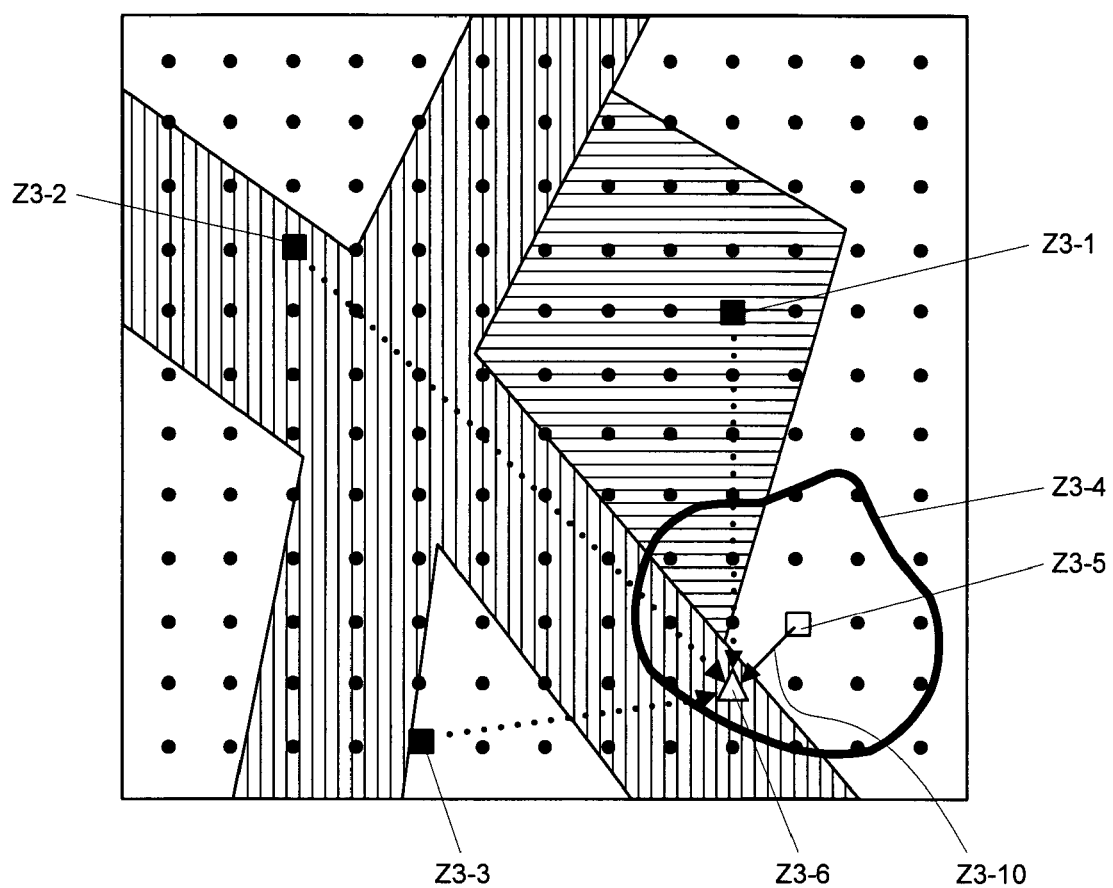
FIG. 8 is a view illustrating an additional embodiment relating to the specification of the quality value Q.

FIG. 8 is a view illustrating an additional embodiment relating to the specification of the quality value Q in FIG. 5 in a model-type manner. Suppose an evaluation terminal Z3-6 indicated with a white triangle, which connects to a base-station candidate Z3-5 indicated with a white square, to specify the quality value Q with a ratio of the desired received signal power and the undesired received signal power (DU ratio) to be observed in the above evaluation terminal Z3-6. The propagation loss to be computed by said first radio-wave propagation characteristic estimation technique is employed in computing the desired signal power. In the event of, as the first radio-wave propagation characteristic estimation technique, employing a distance attenuation value that attenuates in proportional to an exponential power of a distance, a linear distance Z3-10 from the base-station candidate Z3-5 up to the evaluation terminal Z3-6 is employed as a distance.

Z3-1 to Z3-3 indicate the already-installed base stations, or the base station for which installment was decided in the step Z0-6 of FIG. 2 by employing a method relating to the method of the present invention, respectively. The undesired signal power is decided by the propagation loss from each of the base stations Z3-1 to Z3-3 up to the evaluation terminal Z3-6, and the undesired signal transmission power that each already-installed base station emits. As to the undesired signal transmission power to be emitted from each of the already-installed base stations Z3-1 to Z3-3, there are a case where it is assumed to be fixed, and a case where it is decided responding to the traffic quantity to be loaded on each already-installed base station. The high-precision propagation-loss value estimated and stored by said second radio-wave propagation characteristic estimation technique is employed for the propagation loss from each already-installed base station up to the evaluation terminal.

Said evaluation terminal Z3-6 is assumed to be in each location within the cell Z3-4 that said base-station candidate Z3-5 forms to find said DU ratio, and the quality value Q is specified by averaging it. At this moment, there is a case where the location within the above cell Z3-4 in which no traffic occurs is not assumed to be an object of the averaging processing. Or, there is a case where a weighting is made responding to the size of the traffic density within the above cell Z3-4 for averaging it.

In accordance with an additional embodiment relating to the specification of the quality value Q shown in FIG. 8, employing the DU ratio to be observed in a virtual evaluation terminal for the quality value to average it within the cell that the base-station candidate forms enables the more strict quality evaluation that took an extensive view within the cell in terms of the plane.

Figure 9:
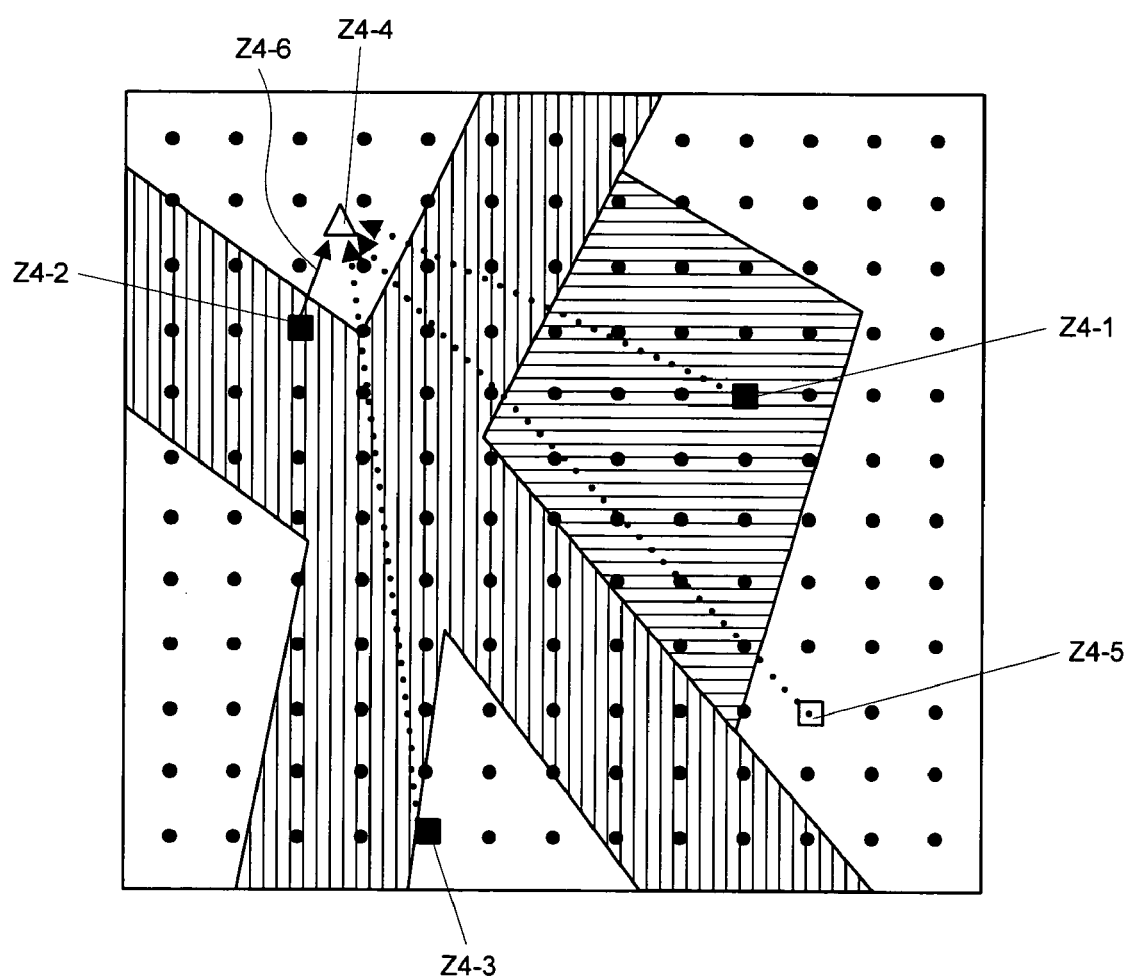
FIG. 9 is a view illustrating a further embodiment relating to the specification of the quality value Q.

FIG. 9 is a view illustrating a further embodiment relating to the specification of the quality value Q in FIG. 5 in a model-type manner. The entire region within the service area is scanned with an evaluation terminal Z4-4 to find the DU ratio in each evaluation-terminal arrangement location, and to specify a ratio satisfying a desired DU ratio as the quality value Q. Assume that the evaluation terminal is connected to the already-installed base station, or the base-station candidate that can make communicate with the highest receiving signal power from the location in which the above terminal was installed, and that the interference signal power is the total sum of the undesired signal powers from the already-installed base stations and the base station candidate other than the base station assumed to connect to the above terminal. The above quality value is defined so that the smaller this total sum is, the higher the quality value becomes.

In an example of FIG. 9, an evaluation terminal Z4-4 connects to an already-installed base station Z4-2, thus the interference signals arrive at the evaluation terminal Z4-4 from already-installed base stations Z4-1 and Z4-3, and a base-station candidate Z4-5. There is a case where a location within the service area in which no traffic occurs is not assumed to be an object of evaluation for measuring the quality value Q. Or, there is a case where the quality value Q is specified by performing weighted addition of the DU ratio responding to the size of the traffic density within the service area.

The propagation loss from the base-station candidate to the evaluation terminal is given with the propagation loss to be computed by said first radio-wave propagation characteristic estimation technique. The propagation loss value between the already-installed base station and the evaluation terminal is estimated and stored by said second radio-wave propagation characteristic estimation technique. As to the undesired signal transmission of each already-installed base station and the base-station candidate, there are a case where it is assumed to be fixed, or a case where it is decided responding to the traffic quantity to be loaded on each base station.

In accordance with a further embodiment relating to the specification of the quality value Q shown in FIG. 9, the base-station cell design achieves that, in adding the base station candidate, took into consideration not only the quality value to be observed within the base-station candidate, but also an influence of the quality deterioration to be observed in the other cells due to addition of the above base-station candidate.

Figure 10:
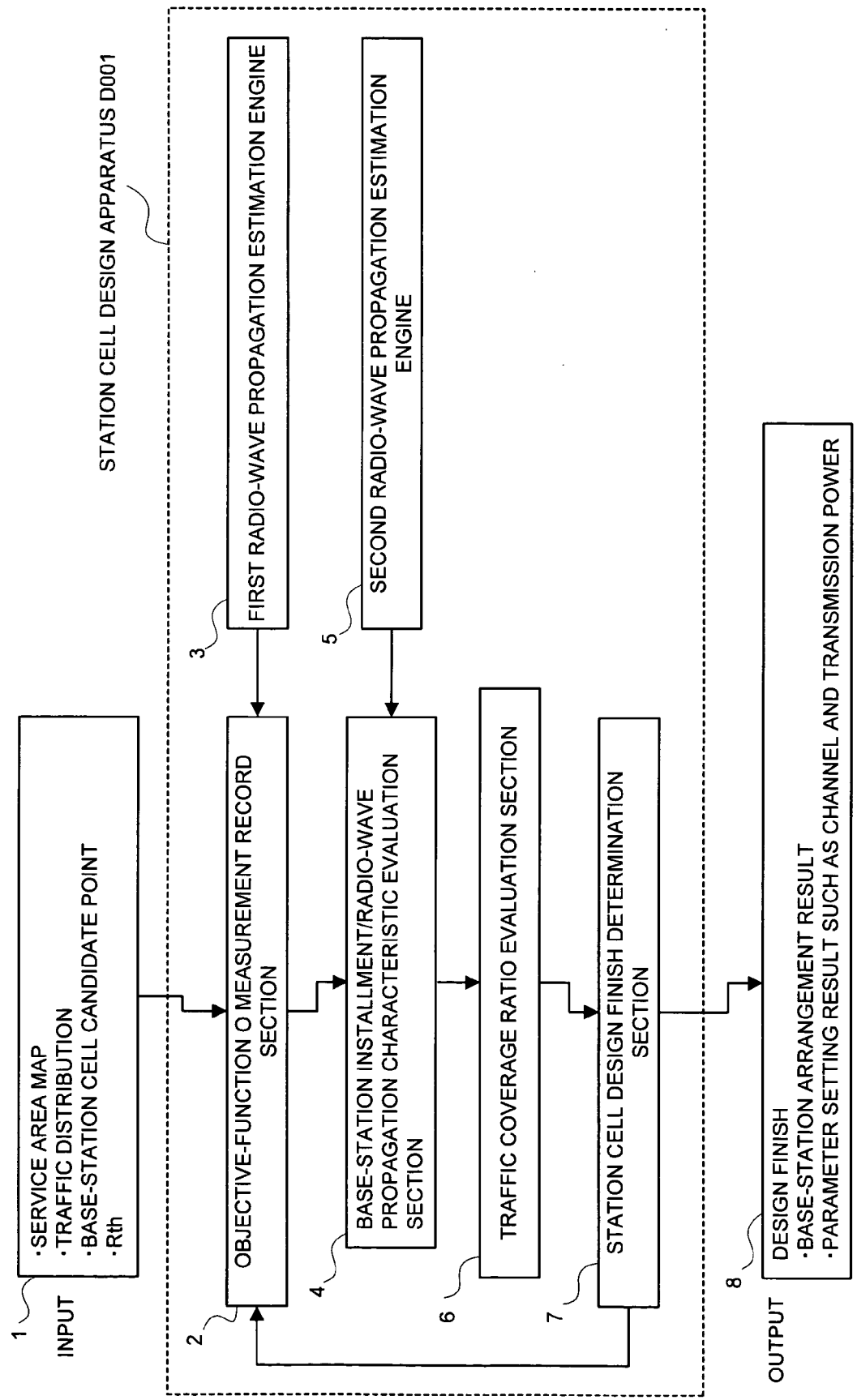
FIG. 10 is a functional block diagram illustrating the apparatus configuration of the first embodiment of the present invention.

FIG. 10 is a view illustrating a cell design apparatus D001 for realizing an operational flow shown in FIG. 2 as a schematic functional block. As input information 1 are listed map information, traffic distribution information, base-station installment candidate point information, and the required traffic coverage ratio Rth (see the step Z0-9 of FIG. 2) of the service area. An objective-function O measurement record section 2 calculates the traffic absorption quantity T and the quality value Q, employing a first radio-wave propagation estimation engine 3 for executing the foregoing first radio-wave propagation estimation technique, calculates the objective-function O responding to these T and Q, and records it in a memory section (particularly, not shown in the figure) in such a manner as shown in FIG. 3.

A base-station installment/radio-wave propagation characteristic evaluation section 4 decides to install the base station at the base-station location candidate point having the maximum objective-function O obtained, employs a second radio-wave propagation estimation engine 5 for executing the foregoing second radio-wave propagation estimation technique, estimates the radio-wave propagation characteristic within the service area with the base station for which installment was newly decided taken as a transmission point, and records it in the memory section.

A traffic coverage ratio evaluation section 6 finds the transmission power of each base station and the area that each base station covers, and calculates the traffic coverage ratio Rc. A cell design finish determination section 7 determines whether the traffic coverage ratio Rc exceeds a required traffic coverage ratio Rth, and when it exceeded, makes determination as to the cell design finish. And, the parameter setting result such as the base-station arrangement result, the channel, and the transmission power is output as output information 8.

Figure 11:
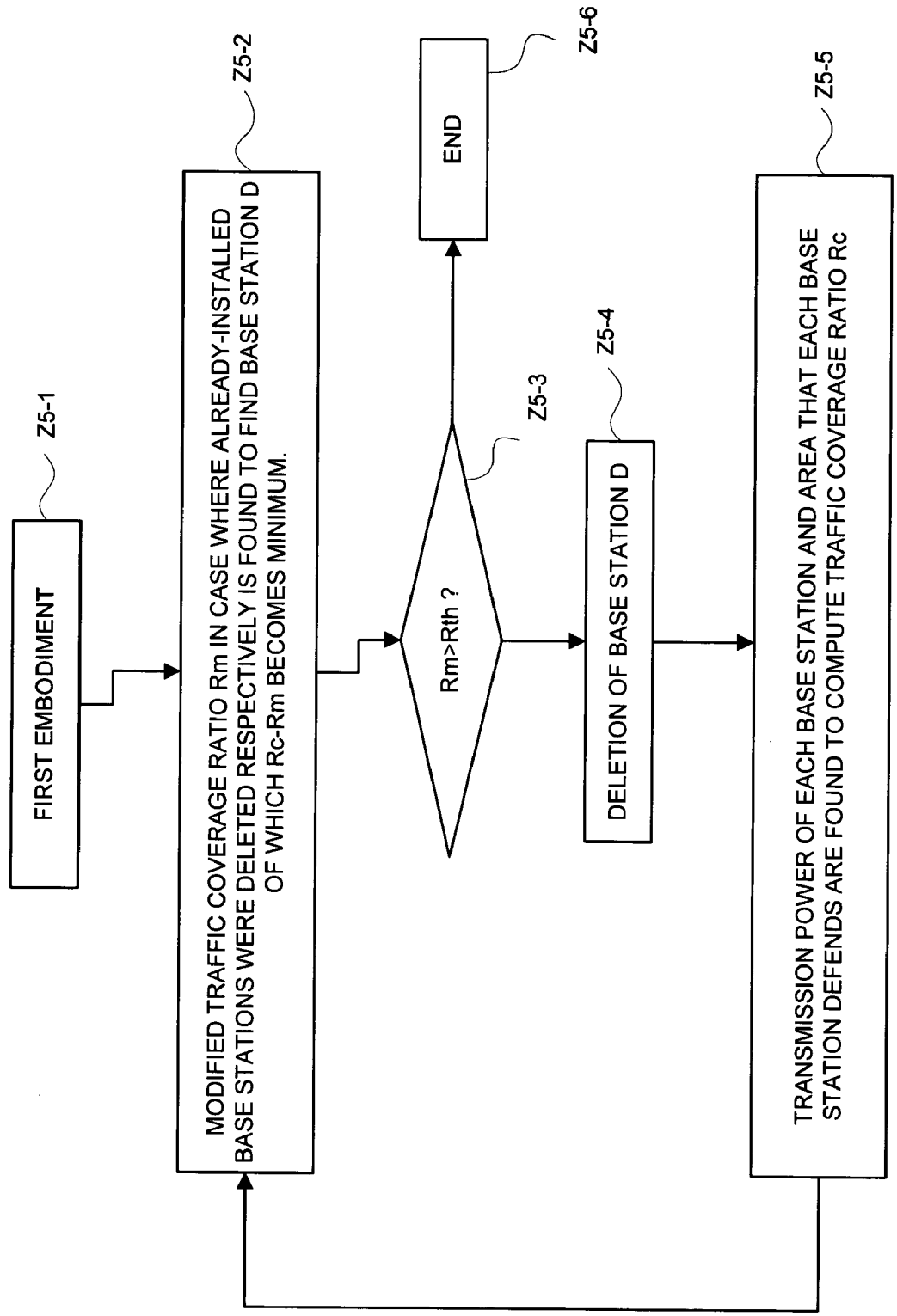
FIG. 11 is a flowchart illustrating the operation of the second embodiment in the base-station cell design algorithm of the present invention.

FIG. 11 is a flowchart illustrating a second embodiment in the base-station cell design algorithm of the present invention. This second embodiment is characterized in being performed continuously after the processing described in the first embodiment of FIG. 2. A step Z5-1 indicates the entire processing of the first embodiment described in FIG. 2. After the processing described in the first embodiment was completed, in a step Z5-2, a modified traffic coverage ratio Rm that is a traffic coverage ratio in a case where each of the already-installed base station was deleted is calculated to find a difference between the traffic coverage ratio Rc of final result from the first embodiment of FIG. 2 and Rm, and to find a base station D of which Rc–Rm is minimum.

At this time, Rm is found by employing the estimation result found in Z0-7 of FIG. 2 by employing the second radio-wave propagation estimation technique. As one example, Rm can be calculated as follows. First, an already-installed base station is assumed to be deleted. And a rate of a total quantity of the traffic that covered by the rest of all the already-installed base station to a total traffic quantity in the entire service area.

As a substitute for this step Z5-2, that is, instead of selection of the base station of which Rc–Rm is minimum, the objective-function O (T, Q) in a case where each base station was deleted may be computed to select the base station of which the objective-function O is maximum at the time that it was deleted as a deletion candidate base station. In this case, the traffic coverage ratio Rm in a case where the base station selected based on the objective-function was deleted is computed, and the processing proceeds to the next step.

In a step Z5-3, it is determined whether or not the modified traffic coverage ratio Rm in a case where it was assumed that the base station D was deleted is still more than the threshold Rth of the traffic coverage ratio. If Rm>Rth is satisfied, then the base station D is deleted from the already-installed base station group in a step Z5-4, and if it is not satisfied, then the processing proceeds to a step Z5-6, and the base-station cell design is finished.

After the base station D was deleted in the step Z5-4, the transmission power of each base station and the area covered by each base station are found once again in a step Z5-5 to re-compute the traffic coverage Rc. The detailed processing in the step Z5-5 is identical to the processing of the step Z0-8 in the first embodiment described in FIG. 2. After the step Z5-4 was finished, the steps subsequent to Z5-2 are repeated once again.

The second embodiment of the present invention explained in FIG. 11 allows the useless base station to be deleted out of the base stations installed in the first embodiment. In the first embodiment described in FIG. 2, there is the possibility of the occurrence of the base station that results in being uselessly installed due to employing the first radio-wave propagation characteristic estimation technique, which needs a small amount of calculations while having low estimation precision, that is, the base station that does not contribute to an improvement in the traffic coverage ratio so much. The second embodiment allows the base station arrangement having a least sufficient number to be realized, by deleting such a useless base station.

Figure 12:
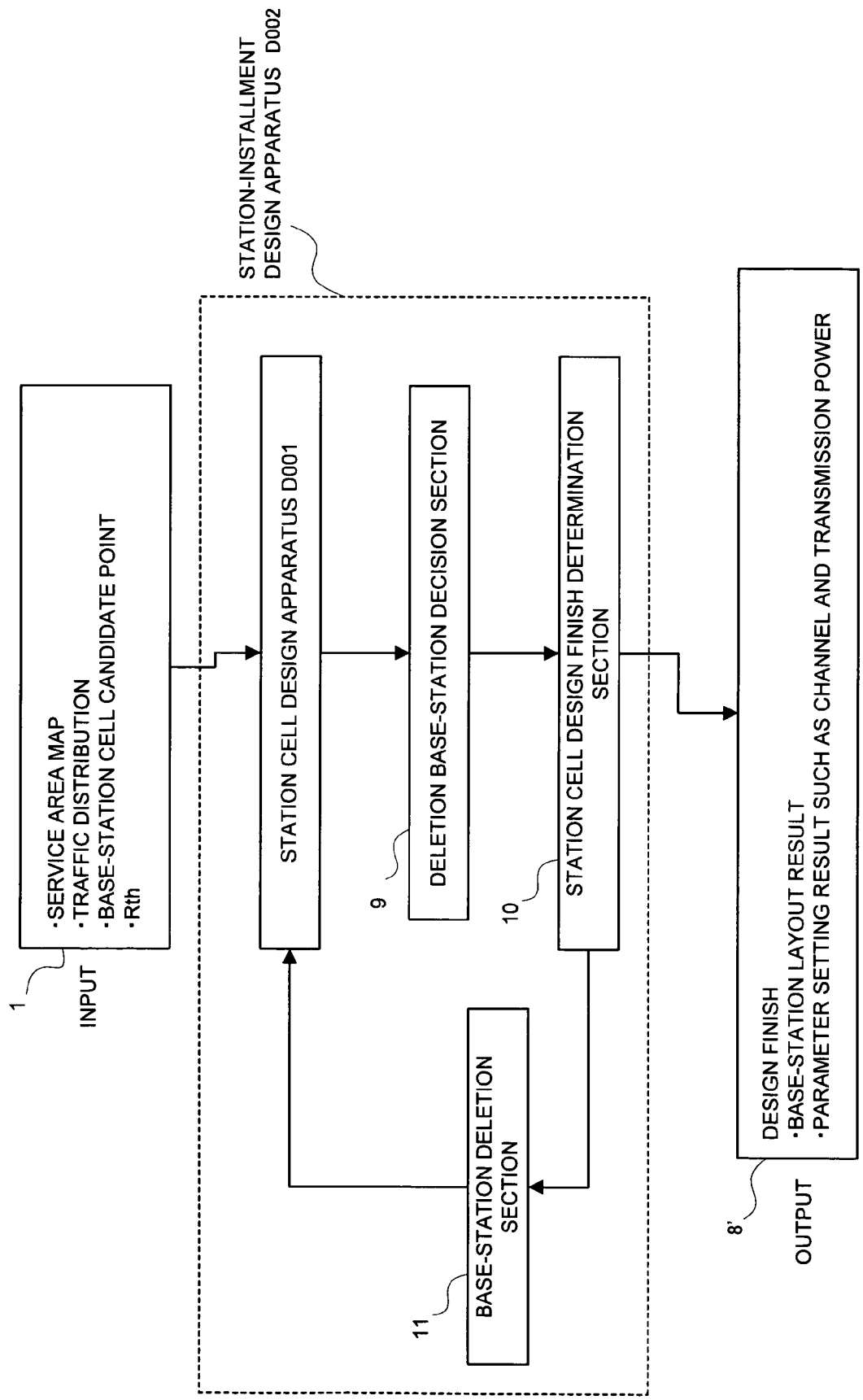
FIG. 12 is a functional block diagram illustrating the apparatus configuration of the second embodiment of the present invention.

FIG. 12 is a view illustrating a cell design apparatus D002 for realizing an operational flow shown in FIG. 11 as a schematic functional block, and the identical portions to FIG. 10 are indicated with identical numerals. The cell design apparatus D002 is connected to the rear stage of the cell design apparatus D001 shown in FIG. 10 for operation, and deletion base-station decision section 9 receives the output of the cell design apparatus D001 of FIG. 10, and decides which base station should be deleted. This technique of the deletion base-station decision is the processing of the step Z5-2 to Z5-5 in a flow of FIG. 11.

A cell design finish determination section 10 determines the finish of deletion base-station decision, and also, a base-station deletion section 11 deletes the base station decided in the deletion base-station decision section 9. Final output information 8' is obtained in such a manner, and the parameter setting result such as the base-station arrangement result, the channel, and the transmission power is obtained. The parameter setting result is made from the output information 8 shown in FIG. 10 by deleting some base stations in the base-station deletion section 11.

Figure 13:
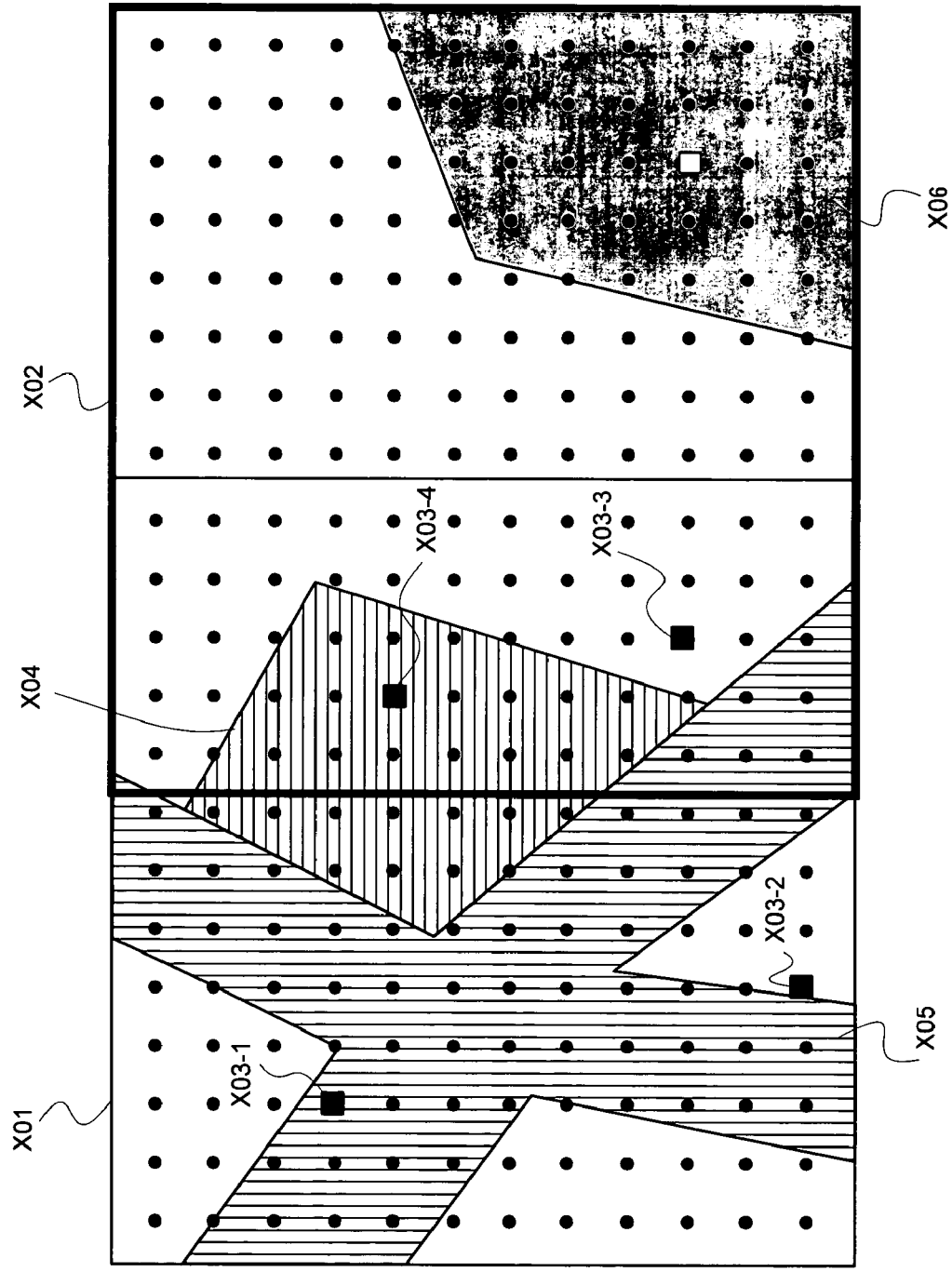
FIG. 13 is a view for explaining an example of a case where a wider-range cell design is made in the embodiment of the present invention.

There is a case where the cell design should be made for the area wider than the area explained by employing FIG. 5 to FIG. 9. As to the cell design technique of the present invention in such a case, one example thereof will be explained by employing FIG. 13. FIG. 13 is a view illustrating a case where the cell design is made for the area wider than that of FIG. 5 etc. The design area shown in FIG. 13 is divided into two areas X01 and X02 that are overlapped with each other. At first, the cell design is executed for the area X01 by the cell design technique of the present invention mentioned above. The base-station group designed in such a manner is shown as X03-i (i=1 to 4) in FIG. 13.

After designing the area X01, next, the area X02 is designed. The area X02 shown with a bold frame is over-lapped with the area X01 shown with a fine frame, and base stations X03-4, and X03-3 designed already in the X01 are included in the area X02. In designing the area X02, the base stations X03-3 and X03-4 are considered as the already-installed base station to make the cell design for the location candidate point other than the above base-station installment location according to the foregoing cell design procedure.

For example, in the event of make the cell design for the entire region, and so forth, the cell design has to be made for an enormous number of the base-station location candidates, whereby it is anticipated that the memory and the necessary computation quantity becomes enormous. Also in the event of making such a wide-range cell design, in accordance with the present invention, extracting a plurality of the areas divided into small pieces allows the reduction of the quantity of the memory and the computation to be achieved. At this moment, by causing the mutually-neighboring area companions to overlap intentionally in making the cell design for a certain cell A, the cell design, which took the interference from the already-installed base station into consideration, becomes possible in a area B neighboring A.

Also, in the event that the base station was already installed as a matter of fact in the service area taken as an object, if the foregoing cell design in accordance with the present invention is made upon presetting the location information, setting channel information, transmission power information, etc. of the above base station, the design of the new-addition base station after due consideration of these interferences becomes possible.

Also, as described in the above, there is a case where information including the XYZ coordinates and the installation direction is given as that of a base-station location candidate point; however in the event that the type of the usable antenna is plural, the received characteristic differs depending upon the type and the installation direction of the antenna. For this, in the event that the type of the usable antenna is plural, computing the objective-function with the type and the installation direction of the antenna taken as a parameter enables a more detailed design. In this case, in the mentioned above, the communication quality value Q (A, k) was defined as a function of a location A in which the base station was installed, and a channel k to be used; however, as Q (A, k, t, d), a type of an antenna t and an installation direction d of the base station have to be added as an element.

The processing flow will be explained in a case where the communication quality value is assumed to be Q (A, k, t, d), based on FIG. 2. In the step Z0-2 of FIG. 2, the quality value Q is computed for all combinations of the base-station location candidate point A, the channel k, the type of the antenna t, and the installment direction d. Also, the objective-function to be computed in the step Z0-3 amounts to O (t (A), Q (A, k, t, d)), and the contents recorded in the memory are ones shown in FIG. 14. That is, T (A), Q (A, k, t, d), and O (T (A), Q (A, k, t, d)) are to be recorded respectively responding to the channel k, the type of the antenna t, and the installation direction d at each base-station candidate point indicated with the index number A (shown as A1, A2, . . . ) respectively.

This example illustrates a case where the number of channel is three, the number of the antenna type is two, the number of installment direction is two patterns for the antenna t=1, and the number of installation direction is four patterns for the antenna t=2. The number of installation direction depends on the sharpness of antenna directivity. For example, in the event of the non-directional antenna, the pattern thereof is only one (1) because it does not make sense to cause the installation direction to vary. In the step Z0-6, the installment-location candidate point at which the maximum objective-function is obtained, the channel, the type of the antenna, and the installation direction are set for the above base station.

Also, in the cell design apparatuses D001 and D002 shown in FIG. 10 and FIG. 12 respectively, in the event that the type of the antenna and the installation direction were added as an element of the quality value Q, the type of the antenna and the installation direction also are simultaneously output as the output information 8 and 8' in addition to the base-station arrangement result, the channel, the transmission power, etc.

Computation of the objective-function in a manner mentioned above allows the appropriate antenna to be select from the type of the antenna that is selectable in plural, and the appropriate installation direction of the antenna to be decided.

Also, as the case may be, in the present invention, there rises a necessity for still performing a lot of the computation processing, depending upon the number of the base-station location candidate point and the received-quality observation point, although the reduction of the computation processing time is realized, as compared with the prior art. So as to further reduce the time required for this processing, the processing program for executing the present invention can be modified to a parallel-computable form. Upon performing the parallel computation, the computation time can be reduced because the computation can be performed simultaneously by employing plural computers. After the parallel computation was performed, the result obtained by each computer is collected to continue the processing. The processing item in the steps Z0-1 to Z0-5 in FIG. 2 where the first radio-wave propagation characteristic estimation technique is employed to search for the parameters for obtaining the maximum objective-function can be executed effective by parallel computing.

There is a necessity for calculating the propagation analysis by the first propagation estimation technique between all points at which the traffic exists (assumed to be a T point) and the base-station location candidate point. The flow shown in FIG. 2 was described that the propagation characteristic was calculated by the first radio-wave propagation characteristic estimation technique whenever each of the quality value Q and the traffic absorption quantity T were calculated; however a packing thereof takes a form of pre-calculating the propagation characteristic, to record it, and at the time of calculating the quality value Q and the traffic absorption quantity T to draw out the recorded value for employing it. This propagation characteristic computation employing the first radio-wave propagation estimation technique with all base-station location candidate points taken as a transmission point can be performed in the parallel processing because the propagation characteristic can be computed independently at each base-station location candidate point. Also, as to the computation of the objective-function, it can be performed in a parallel processing because the objective-function can be computed independently for each installment condition. Hereinafter, the technique of the parallel processing will be described in details.

Figure 15:
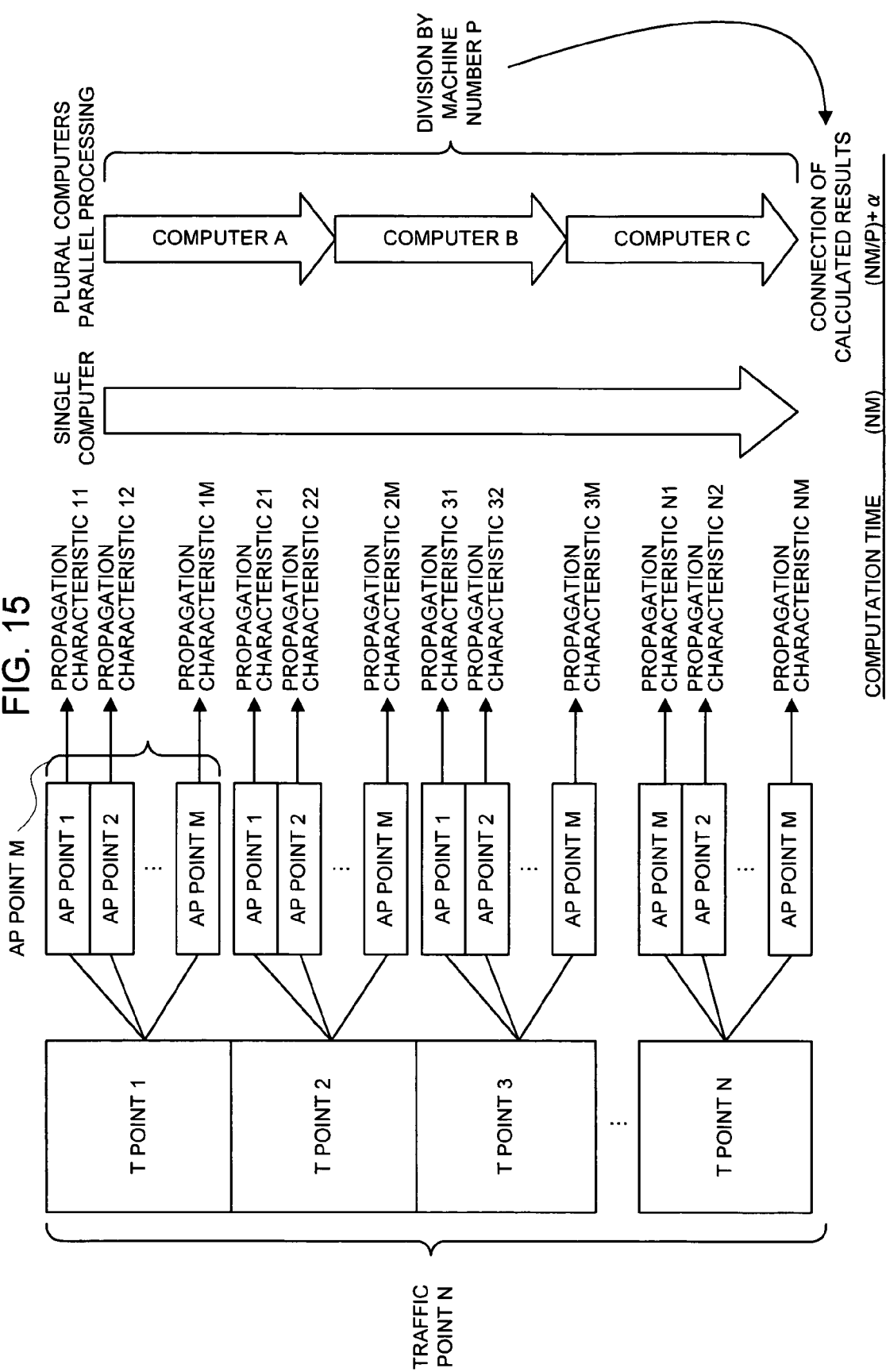
FIG. 15 is a view illustrating an example of a case where a plurality of the computers are used to perform the processing in the embodiment of the present invention in parallel.

The subject number for finding the propagation characteristic numbers an occurrence point number N of the traffic and a base-station installment-location candidate point number M. Like FIG. 15, there exist N*M kinds of the propagation characteristics that should be found, ranging from a propagation characteristic 11 to a propagation characteristic NM (* signifies multiplication). This is divided by a parallel-processable computer number P to compute an N*M/P portion of the propagation characteristic respectively. By connecting the results obtained by respective computers, all the result of propagation characteristics 11 to NM can be obtained. So as to connect the result of the parallel processing, an overhead for communication is required, whereby α is added to the computation time in the figure.

Figure 16:
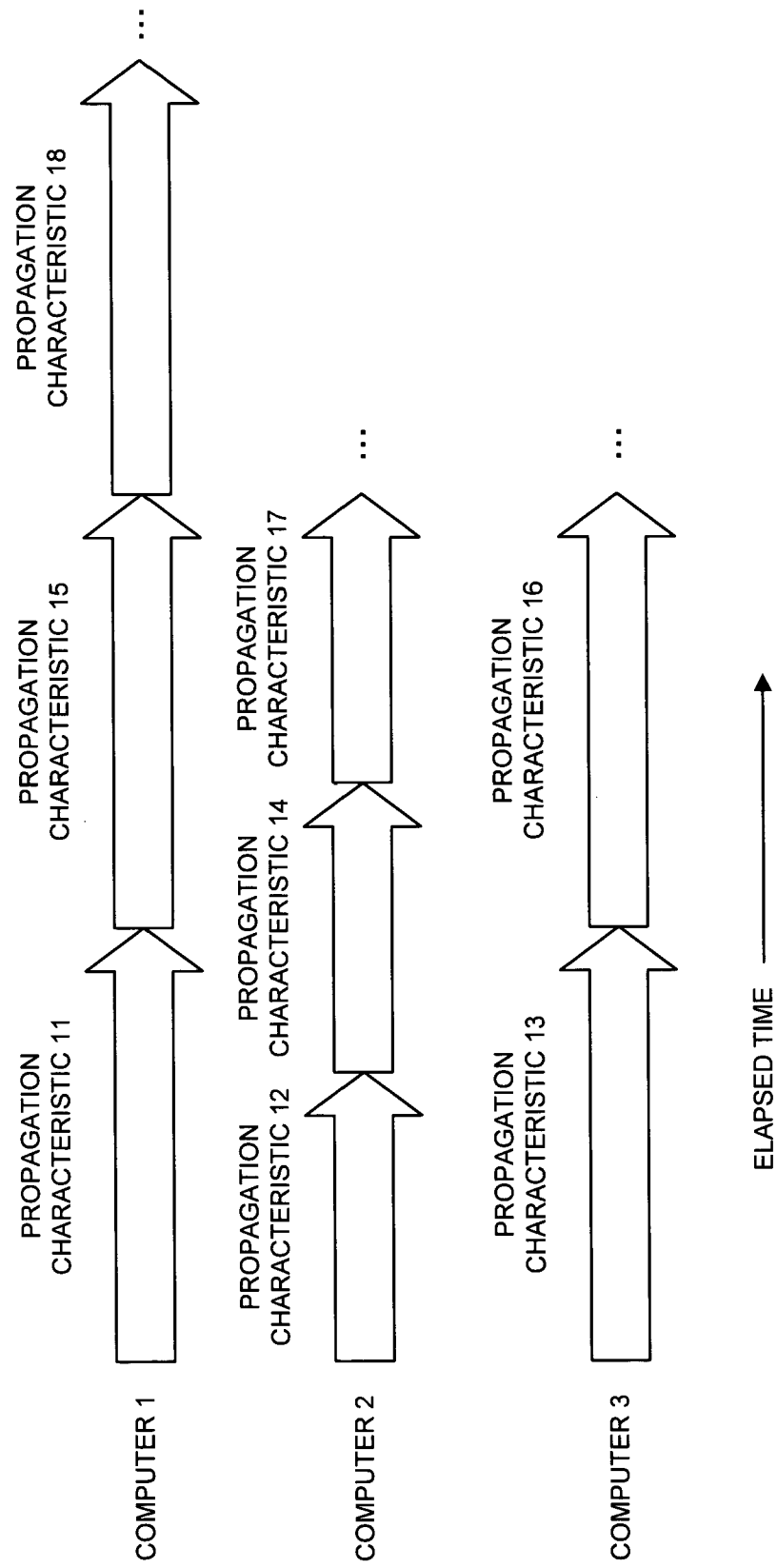
FIG. 16 is a view illustrating another example of a case where a plurality of the computers are used to perform the processing in the embodiment of the present invention in parallel.
Figure 17:
FIG. 17 is a view for explaining the prior art.
Figure 18:
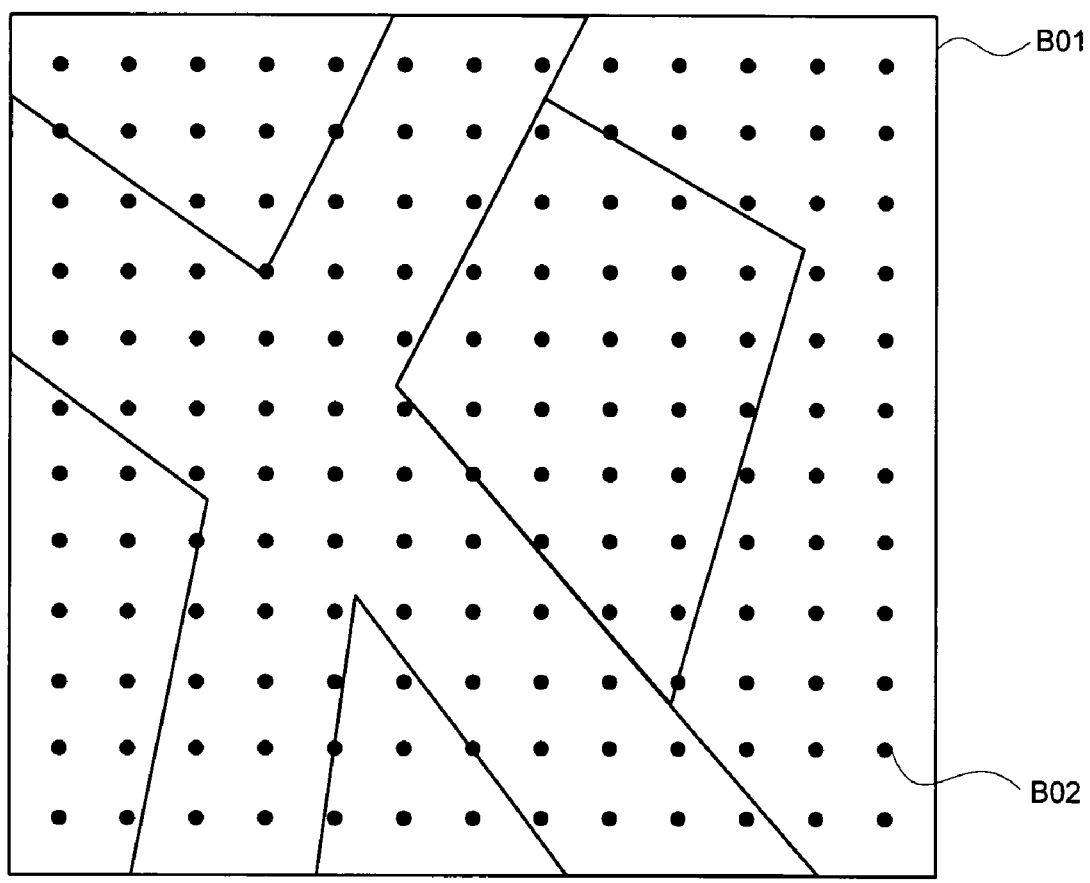
FIG. 18 is a view for explaining the additional prior art.

Also, in the event that the computing capability of the computer for performing the parallel processing differs, when the processing amount is divided identically for allocation, the time that the result is obtained differs greatly, and until a computer of which the computing speed is slow gains the result, the other computer resource becomes useless sometimes. For this, a method can be employed of dividing the object that requires the computation into smaller units (at least every one propagation characteristic) for each computer, at the stage that the result for small unit was obtained, to sequentially process the other unit that has not been computed yet (see FIG. 16).

The objective-function calculation for each installment parameter has to be performed by the pattern number of the installment-location candidate point number (M)×the channel number (C)×the kind number of the antenna (T)×the installment direction number (D). So as to perform this calculation at a high speed, similarly to the foregoing, the parallel processing by the computer is performed. All pattern numbers amount to M*C*A*D, whereby in the event of employing the computer group having an identical processing capability (computer number P), M*C*A*D/P of the processing is allocated for each computer for computation. In the event of using the computers having different processing capabilities, the processing is performed similarly to FIG. 16.

As mentioned above, by the estimation employing the first propagation characteristic estimation technique, and by performing the calculation of the objective-function in the parallel processing, the reduction of the computation time can be realized.

Also, the present invention also can be used for deciding the channel, the transmission electric power, the type of the antenna, the installation direction etc. for the base station preinstalled actually. This can be realized by designating the layout of the already-installed base station as a base-station location candidate point to assume that the determination criteria of the step Z0-9 in FIG. 2 is not the traffic coverage ratio, but the completion of the installation for all base-station location candidate points. As a result, it is possible to design the channel, the transmission power, the type of the antenna, and the installation direction at each base station so that they have the appropriate values respectively.

In this method, there is no necessity for making the propagation estimation with a large number of the base-station location candidate points taken as a transmission point because the installment location of the base station has been pre-decided. Thus, by making the propagation estimation not by employing the first propagation estimation technique, but by employing only the second propagation estimation technique in the step Z0-2, the more correct propagation estimation result can be reflected.

In addition, in the above-mentioned embodiment, the service area was explained as a two-dimensional one; however this is an example for facilitating the grasp of the contents, and the three-dimensional space is similarly applicable for it. Also, needless to say, the configuration can be made so that a flow of each operational processing mentioned above is pre-filed in the record medium as a program to cause the computer to read this for execution.

The design method of the present invention does not need the perception and the experience of a human being because the method can make quantitative judgment by defining and using the objective-function of which the argument is at least one of the traffic absorption quantity and the communication quality value to add the base station.

Also, in accordance with the present invention, the effect exists of reducing the quantity of the radio-wave analysis processing that accounts for a majority of the cell design processing, and of enabling the fast base-station cell design. Because, the invention employs a technique of which the calculation amount is few for the radio-wave propagation characteristic evaluation to be used in selecting the base station that should be added from all of the base-station candidates and employs a technique of which the calculation amount is much, but provides high precision for the radio-wave propagation characteristic evaluation to be made after the selection and put the result of the high-precision radio-wave propagation characteristic evaluation to be made for estimating the interference quantity in selecting the arrangement location of the base station to be added subsequently.

Furthermore, in accordance with the present invention, deleting the base stations sequentially that do not contribute to an increase in the traffic coverage ratio from the above-mentioned additional base-station group allows the base-station arrangement having a least sufficient number to be realized. And as it is not necessary to make a new radio-wave analysis for this already-installed base-station group, in sequentially deleting the base stations because the high-precision radio-wave analysis has been completed in the entire service area with each already-installed base station taken as a transmission point, the design by the present invention can be performed at a high speed.

What is claimed is:

1. A base-station cell design method in a mobile communication system, wherein a service area, and a traffic density distribution within this service area are given to locate base stations within the above service area, said base-station cell design method characterized in including a base-station layout decision step of sequentially deciding until traffic coverage ratio exceeds desired traffic coverage ratio and said traffic coverage ratio is defined as a rate of a total traffic quantity absorbed by the base stations to all the traffic quantity that occurs within said service area, said layout decision step comprising:

a step of calculating a traffic absorption quantity and a communication quality value in each of candidate locations of said base station;

an objective-function calculation step of calculating a predetermined objective-function responding to the quantity and the value that are this calculated result; and a step of selecting a layout at which the base station is installed responding to this objective-function.

2. The base-station cell design method according to claim 1, said base-station cell design method characterized in being adapted so that:

in said objective-function calculation step, the higher said quantity and (or) quality are, the higher objective-function is given; and in said step of selecting the layout at which the base station is located, the base station is located in the location of which said objective-function is highest.

3. The base-station cell design method according to claim 2, said base-station cell design method characterized in being adapted so that:

a first radio-wave propagation characteristic estimation technique having a first estimation precision is employed for estimating a radio-wave propagation characteristic within said service area for the candidate location of base station taken as a transmission point; and a second radio-wave propagation characteristic estimation technique having an estimation precision higher than said first estimation precision is employed for estimating a radio-wave propagation characteristic within said service area for the decided location of base station taken as a transmission point.

4. The base-station cell design method according to claim 3, said base-station cell design method characterized in further including a deletion step of sequentially deleting said base stations which was decided until said traffic coverage ratio Rc satisfies a desired traffic coverage ratio Rth.

5. The base-station cell design method according to claim 4, said base-station cell design method characterized in, in said deletion step, calculating a modified traffic coverage ratio Rat without each of the located base stations to find the base station of which a difference between this Rat and said traffic coverage ratio Rc becomes minimum, and in the case that the modified traffic coverage ratio Rm in a case where this base station was deleted satisfies said Rth, to delete the above base station.

6. The base-station cell design method according to claim 4, said base-station cell design method characterized in, in said deletion step, calculating said objective-function in a case where each of the base stations was deleted, with the base station without which the above objective-function becomes maximum at the time that it was deleted taken as a candidate for deletion, to find a modified traffic coverage ratio Rm in a case where this candidate for deletion was deleted, and in the case that this Rm satisfies said Rth, to delete said candidate for deletion.

7. The base-station cell design method according to claim 3, said base-station cell design method characterized in:
   setting a covered area shape to be computed by said first radio-wave propagation characteristic estimation technique, or a fixed shape as an area shape that an bases station candidate covers; and
   setting a covered area shape to be computed with an estimation result estimated and stored by said second radio-wave propagation characteristic estimation technique as an area shape that the located base station.

8. The base-station cell design method according to claim 7, said base-station cell design method characterized in that, an covered area shape for located base station and candidate base station is set based on the area where each observation point within area received desired quality signals and selects a belonging base station with the observation point receives the highest received quality and power of all base stations.

9. The base-station cell design method according to claim 7, said base-station cell design method characterized in that, an covered area shape for located base station and candidate base station is set based on the area where total traffic quality is below the traffic capacity of the base station as an area shape that said base station for which installment was decided and said base-station candidate cover respectively, is set an area such that a total of the traffic quantity within the above area falls below the traffic quantity that the base station can accommodate.

10. The base-station cell design method according to claim 3, said base-station cell design method characterized in, by taking into consideration a transmitted electric power of said base station for which installment was decided, and a determination threshold as well in a received demodulation processing in the above base station, in addition to the estimation result estimated by said second radio-wave propagation characteristic estimation technique, deciding said area shape.

11. The base-station cell design method according to claim 3, said base-station cell design method characterized in being adapted so that, in allocating a channel to said base station for which installment was decided within said service area, said objective-function is calculated for all channels with a radio-wave propagation characteristic estimated by said second radio-wave propagation characteristic estimation technique to allocate the channel of which the objective-function becomes maximum.

12. The base-station cell design method according to claim 3, said base-station cell design method characterized in that said candidate location is seasoned with information relating to a direction of the base station as well for decision.

13. The base-station cell design method according to claim 3, said base-station cell design method characterized in, in the event that said candidate location was pre-given a priority, as said objective-function, using a new objective-function having the above priority considered for this objective-function.

14. The base-station cell design method according to claim 3, said base-station cell design method characterized in being adapted so that said objective-function is varied in the event that said objective-function has an identical value in the different candidate locations or channels as well.

15. The base-station cell design method according to claim 1, said base-station cell design method characterized in, as said traffic absorption quantity, employing a traffic quantity that occurs within an area to be covered by a base-station candidate to be computed by said traffic density distribution, or a rate of this traffic quantity to a total traffic quantity that occurs within said service area.

16. The base-station cell design method according to claim 1, said base-station cell design method characterized in, as said traffic absorption quantity, employing a traffic quantity that occurs within the area other than the area covered by the base station for which installment was decided, out of the areas to be covered by the base-station candidate to be computed by said traffic density distribution, or a ratio of this traffic quantity to a total traffic quantity that occurs within said service area.

17. The base-station cell design method according to claim 1, said base-station cell design method characterized in, as said traffic absorption quantity, employing a total traffic quantity that occurs in all the area to be covered by the base station for which installment was decided and the base-station candidate, or a ratio of this total traffic quantity to a total traffic quantity that occurs within said service area.

18. The base-station cell design method according to claim 1, said base-station cell design method characterized in that, as said quality value, are given a desired received signal power/(an undesired received signal power+a noise signal power), the desired received signal power/the undesired received signal power, a bit error ratio, a frame error ration.

19. The base-station cell design method according to claim 1, said base-station cell design method characterized in:
   as said quality value, employing a sum total of interference quantities from the base stations for which installment was decided, said interference quantity being observed in the base-station candidate location;
   in computing the interference quantity from the already-installed base station, employing a propagation-loss estimation result computed and stored by said second radio-wave propagation characteristic estimation technique; and
   deciding said quality value so tat the smaller the sum total of said interference quantity is, the higher the quality value becomes.

20. The base-station cell design method according to claim 1, said base-station cell design method characterized in, as said quality value, employing an average of a ratio of a desired-signal electric power: an undesired-signal electric power that a terminal within the area that the additional base-station candidate covers observes to exclude a location within the above covered area in which no traffic occurs in averaging it.

21. The base-station cell design method according to claim 1, said base-station cell design method characterized in, as said quality value, employing an average of a ratio of a desired-signal electric power: an undesired-signal electric power that a terminal observes within the entire region of the service area to exclude a location in which no traffic occurs within the above covered area in averaging it.

22. The base-station cell design method according to claim 1, said base-station cell design method characterized in, as said quality value, employing a rate, which satisfies a desired ratio of a desired-signal electric power: an undesired-signal electric power, out of ratios of the desired-signal electric power: the undesired-signal electric power that a terminal observes in the entire service area.

23. The base-station cell design method according to claim 1, said base-station cell design method characterized in assuming a transmitted power of the base station for which installment was decided or the base-station candidate to be a fixed value, said transmitted power being referred to in computing said quality value.

24. The base-station cell design method according to claim 1, said base-station cell design method characterized in deciding a transmitted power of the base station for which installment was decided or the base-station candidate with the traffic quantity to be absorbed by the above base station, said transmitted power being referred to in computing said quality value.

25. The base-station cell design method according to claim 1, said base-station cell design method characterized in:
    as said first radio-wave propagation characteristic estimation technique, employing a technique that an electric power attenuates in proportional to an exponential power of a distance; and
    as said second radio-wave propagation characteristic estimation technique, employing a ray tracing technique.

26. The base-station cell design method according to claim 1, said base-station cell design method characterized in that no location within the service area in which no traffic occurs is included in said candidate location.

27. The base-station cell design method according to claim 1, said base-station cell design method characterized in that no location in which the base station is physically impossible to arrange is included in said candidate location.

28. The base-station cell design method according to claim 1, said base-station cell design method characterized in:
    with regard to a first service area, executing said base-station layout decision step; and
    afterward, with regard to a second service area that is partially overlapped with said first service area, executing said base-station installment step for the base-station candidate location other than the base station for which installment was decided in said first service area.

29. The base-station cell design method according to claim 1, said base-station cell design method characterized in that said objective-function is given as a function of the base-station candidate location, the channel, the type of antennas to be used, and its installment direction.

30. The base-station cell design method according to claim 1, said base-station cell design method characterized in being adapted so that said objective-function calculation steps are performed in parallel.

31. A base-station cell design apparatus adapted so that, in designing a base-station installment in a mobile communication system, a plurality of base-station candidate locations are given within a service area to install a base station in anyone of these base-station candidate locations, said base-station cell design apparatus characterized in including:
    objective-function calculation means for calculating a predetermined objective-function responding to a traffic absorption quantity and a communication quality value in each of said base-station candidate locations; and
    base-station layout decision means for deciding a layout at which the base station is installed responding to this objective-function,
    wherein said objective-function is giving as a function of the base station candidate location, the channel, the type of antennas to be used, and its installment direction.

32. A computer-readable medium storing a program for causing a computer to execute a base-station cell design method in a mobile communication system, wherein a service area, and a traffic density distribution within this service area are given to arrange a base station within the above service area, said program characterized in including a base-station layout decision step of, with a rate of a total traffic quantity that can be absorbed by the base stations arranged within said service area to all traffic quantity that occurs within said service area taken as a traffic coverage ratio, sequentially deciding layouts at which the base station is installed until said traffic coverage ratio exceeds a desired traffic coverage ratio,
    said base-station layout decision step comprising:
    step of calculating a traffic absorption quantity and a communication quality value in each of said base-station candidate locations;
    an objective-function calculation step of calculating a predetermined objective-function responding to the quantity and the value that are this calculated result; and
    a step of selecting the layout at which the base station is installed responding to this objective-function.

33. The computer readable medium storing according to claim 32, said program characterized in being adapted so that:
    in said objective-function calculation step, the higher said quantity and (or) value are, the higher objective-function is given; and
    in said step of selecting the layout at which the base station is installed, the location of which said objective-function is highest is decided.

34. The computer readable medium storing according to claim 33, said program characterized in being adapted so that:
    a first radio-wave propagation characteristic estimation technique having a first estimation precision is employed for estimating a radio-wave propagation characteristic within said service area with the candidate location in which said base station is installed taken as a transmission point; and
    a second radio-wave propagation characteristic estimation technique having an estimation precision higher than said first estimation precision is employed for estimating a radio-wave propagation characteristic within said service area with the above base station after a case where said base station was installed taken as a transmission point.

35. The computer readable medium storing according to claim 33, said program characterized in being adapted so tat said objective-function is varied in the event that said objective-function has an identical value in different candidate locations or channels as well.

36. The computer readable medium according to claim 34, said program characterized in further including a deletion step of sequentially deleting said base stations for which installment was decided until said traffic coverage ratio satisfies a desired traffic coverage ratio.

37. The computer readable medium storing according to claim 36, said program characterized in, in said deletion step, finding a modified traffic coverage ratio Rm in a case where each of base stations for which installment was decided was deleted to find the base station of which a difference between this Rm and said traffic coverage ratio Rc becomes minimum, and in the event that the modified traffic coverage ratio Rm in a case where this base station was deleted satisfies said Rth, to delete the above base station.

38. The computer readable medium storing according to claim 36, said program characterized in, in said deletion step, calculating said objective-function in a case where each of base stations for which installment was decided was deleted, with the base station of which the above objective-function becomes maximum at the time that it was deleted taken as a candidate for deletion, to find a modified traffic coverage ratio Rm in a case where this candidate for deletion was deleted, and in the event that this Rm satisfies said Rth, to delete said base station.

39. The computer readable medium storing according to claim 36, said program characterized in, in addition to the estimation result estimated by said second radio-wave propagation characteristic estimation technique, by taking into consideration a transmitted electric power of said base station for which installment was decided, and a determination threshold in a received demodulation processing in the above base station as well, deciding said area shape.

40. The computer readable medium storing according to claim 36, said program characterized in being adapted so that, in allocating a channel to said base station for which installment was decided within said service area, said objective-function is calculated for all channels with a radio-wave propagation characteristic estimated by said second radio-wave propagation characteristic estimation technique to allocate a channel of which the objective-function becomes maximum hereto.

41. The computer readable medium storing according to claim 34, said program characterized in:
as an area shape that an additional base-station candidate covers, setting a shape to be computed by said first radio-wave propagation characteristic estimation technique, or a fixed shape, and
as an area shape that the base station for which installment was decided covers, setting a shape to be computed with an estimation result estimated and stored by said second radio-wave propagation characteristic estimation technique.

42. The computer readable medium storing according to claim 41, said program characterized in that, as an area shape that the base station for which installment was decided and said base-station candidate cover respectively, is set an area such tat a connection to the base station, which satisfies a desired received quality within each covered area, and yet of which a received quality or a received electric power is highest becomes possible.

43. The computer readable medium storing according to claim 42, said program characterized in that, as an area shape that the base station for which installment was decided, and said base-station candidate cover respectively, is set an area such that a total of the traffic quantity within the above area falls below the traffic quantity that the base station can accommodate.

44. The computer readable medium storing according to claim 41, said program characterized in, as said traffic absorption quantity, employing a traffic quantity that occurs within the area to be covered by the base-station candidate to be calculated by said traffic density distribution, or a rate of this traffic quantity to a total traffic quantity that occurs within said service area.

45. The computer readable medium storing according to claim 41, said program characterized in, as said traffic absorption quantity, employing a traffic quantity that occurs in the area other than the area covered by the base station for which installment was decided, out of the areas to be covered by the base-station candidate to be computed by said traffic density distribution, or a rate of this traffic quantity to a total traffic quantity that occurs within said service area.

46. The computer readable medium storing according to claim 41, said program characterized in, as said traffic absorption quantity, employing a total traffic quantity that occurs in all the area to be covered by the additional base station for which installment was decided, and the base-station candidate, or a rate of this total traffic quantity to a total traffic quantity that occurs within said service area.

47. The computer readable medium storing according to claim 41, said program characterized in that, as said quality value, are given a desired received signal power/(a undesired received signal power+a noise signal power), the desired received signal power/the undesired received signal power, a bit error ratio, a frame error ration.

48. The computer readable medium storing according to claim 41, said program characterized in: as said quality value, employing a sum total of interference quantities from the base station for which installment was decided, said interference quantity being observed in the base-station candidate location;
in computing the interference quantity from the already-installed base station, employing a propagation-loss estimation result computed and stored by said second radio-wave propagation characteristic estimation technique; and
deciding said quality value so that the smaller said sum total of said interference quantity is, the higher the quality value becomes.

49. The computer readable medium storing according to claim 48, said program characterized in assuming a transmitted power of the base station for which installment was decided, or the base-station candidate to be a fixed value, said transmitted power being referred to in computing said quality value.

50. The computer readable medium storing according to claim 48, said program characterized in deciding a transmitted power of the base station for which installment was decided, or the base-station candidate with the traffic quantity to be absorbed by the above base station, said transmitted power being referred to in computing said quality value.

51. The computer readable medium storing according to one of claim 41, said program characterized in, as said quality value, employing an average of a ratio of a desired-signal electric power: an undesired-signal electric power that a terminal within the area that the additional base-station candidate covers observes to exclude a location within the above covered area in which no traffic occurs in averaging it.

52. The computer readable medium storing according to claim 41, said program characterized in, as said quality value, employing an average of a ratio of a desired-signal electric power: an undesired-signal electric power that a terminal observes within the entire service area to exclude a location within the above service area in which no traffic occurs in averaging it.

53. The computer readable medium storing according to claim 41, said program characterized in, as said quality value, employing a rate that satisfies a desired ratio of a desired-signal electric power: an undesired-signal electric power, out of the ratios of the desired-signal electric power the undesired-signal electric power that a terminal observes in the entire service area.

54. The computer readable medium storing according to claim 32, said program characterized in:
as said first radio-wave propagation characteristic estimation technique, employing a technique that an electric power attenuates in proportional to an exponential power of a distance; and
as said second radio-wave propagation characteristic estimation technique, employing a ray tracing technique.

55. The computer readable medium storing according to claim 32, said program characterized in that no location within the service area in which no traffic occurs is included in said candidate location.

56. The computer readable medium storing according to claim 32, said program characterized in that no location in which the base station is physically impossible to arrange is included in said candidate location.

57. The computer readable medium storing according to claim 32, said program characterized in that said candidate location is seasoned with information relating to a direction of the base station as well for setting.

58. The computer readable medium storing according to claim 32, said program characterized in, in the event that said candidate location was pre-given priority, as said objective-function, using a new objective-function having the above priority considered for this objective-function.

59. The computer readable medium storing according to claim 32, said program characterized in:
with regard to a first service area, executing said base-station layout decision step; and
afterward, with regard to a second service area that is partially overlapped with said first service area, executing the above base-station layout decision step for the base-station candidate location other than the base station candidate location for which installment was decided in said first service area.

60. The computer readable medium storing according to claim 32, said program characterized in that said objective-function is given as a function of the base-station candidate location, the channel, the type of antennas to be used, and its installment direction.

61. The computer readable medium storing according to claim 32, said program characterized in being adapted so that said objective-function calculation steps are performed in parallel.

* * * * *